US005909460A

United States Patent [19]
Dent

[11] Patent Number: 5,909,460
[45] Date of Patent: Jun. 1, 1999

[54] EFFICIENT APPARATUS FOR SIMULTANEOUS MODULATION AND DIGITAL BEAMFORMING FOR AN ANTENNA ARRAY

[75] Inventor: Paul W. Dent, Stehag, Sweden

[73] Assignee: Ericsson, Inc., Research Triangle Park, N.C.

[21] Appl. No.: 08/568,664

[22] Filed: Dec. 7, 1995

[51] Int. Cl.[6] .................................................... H04B 1/707

[52] U.S. Cl. ......................... 375/200; 375/206; 375/260; 375/308; 375/347; 342/383

[58] Field of Search .................................... 375/260, 308, 375/347, 200, 206; 342/354, 367, 368, 373, 374, 380, 383

[56] References Cited

U.S. PATENT DOCUMENTS

| | | |
|---|---|---|
| 4,216,475 | 8/1980 | Johnson . |
| 4,965,602 | 10/1990 | Kahrilas et al. . |
| 5,048,059 | 9/1991 | Dent . |
| 5,077,562 | 12/1991 | Chang et al. . |
| 5,151,919 | 9/1992 | Dent . |
| 5,218,619 | 6/1993 | Dent . |
| 5,353,352 | 10/1994 | Dent et al. . |
| 5,357,454 | 10/1994 | Dent . |
| 5,434,578 | 7/1995 | Stehlik . |
| 5,497,398 | 3/1996 | Tzannes et al. .......................... 375/260 |
| 5,535,240 | 7/1996 | Carney et al. ........................... 375/260 |
| 5,621,752 | 4/1997 | Antonio et al. .......................... 375/347 |

FOREIGN PATENT DOCUMENTS

| | | |
|---|---|---|
| 446 610 | 9/1991 | European Pat. Off. . |
| WO95/28015 | 10/1995 | WIPO . |

*Primary Examiner*—Don N. Vo
*Attorney, Agent, or Firm*—Burns, Doane, Swecker & Mathis, LLP

[57] ABSTRACT

A digital beamforming network for transmitting a first number of digital information signal using a second number of antenna array elements is disclosed. Assemblers are used for assembling one information bit selected from each of the information signals into a bit vector. Digital processors have an input for the bit vector and a number of outputs equal to the second number of antenna elements and process the bit vector. Finally, modulation waveform generators coupled to each of the second number of outputs generate a signal for transmission by each antenna element.

67 Claims, 13 Drawing Sheets

EFFICIENT APPARATUS FOR SIMULTANEOUS MODULATION AND DIGITAL BEAMFORMING FOR AN ANTENNA ARRAY

FIELD OF THE DISCLOSURE

The present invention relates to digital beamforming, and more particularly to an efficient apparatus for simultaneous modulation and digital beamforming for an antenna array.

BACKGROUND OF THE DISCLOSURE

Electronically steered directive antenna arrays according to the known art use a technique known as digital beamforming. In digital beamforming, a plurality of signal waveforms N, which are to be transmitted, are represented by sequences of numerical samples, with the aid of Analog-to-Digital (AtoD) convertors, if necessary. In general the complex number sequences are applied to the inputs of a numerical processor known as a digital beamforming network. The digital beamforming network computes a number M of numerical output sequences corresponding to the number of elements in an antenna array that have to be driven. The general complex output sequences are converted to analog waveforms with the aid of Digital-to-Analog (DtoA) convertors for modulating a radio frequency carrier using, for example, a quadrature modulator of a known type. The modulated radio frequency waves are then amplified for transmission by respective antenna elements. This prior art digital beamforming network effectively performs a multiplication of a complex vector of N inputs with an MxN complex matrix of coefficients to form a complex vector of M outputs, for each time sample of the input signals.

A prior art digital beamforming network is illustrated in FIG. 1. Information signals, which may be analog signals such as speech, are converted to digital signals using AtoD convertors 10. The output signals from the AtoD converter 10 may, for example, be PCM signals of 8 kilosamples per second of 16-bit digitized samples.

The total bit rate of 128 Kilobits/sec is usually considered excessive for transmission of digital speech over radio links. As a result, an encoder 11, which may be a Residually Excited Linear Predictive encoder (RELP) or one of the other known forms such as Sub-band, CELP or VSELP is used to achieve significant compression of voice bit rates down to 8 kilobits per second or even lower while preserving reasonable telephone quality. Such encoders remove as much of the natural redundancy from speech as possible making received quality more sensitive to bit errors. It is therefore common to expand the bitrate again by replacing some redundancy in the form of more intelligent error correction coding. The net data stream is then impressed on a radio wave for transmission using any of the known digital modulation techniques such as PSK, QPSK, Offset-QPSK, Pi/4-DQPSK, 16 QAM and so on. In PSK, the radio carrier is simply inverted in phase depending on whether the data bit being transmitted is a binary ‘1’ or a ‘0’. The abrupt inversion of the phase gives rise to spectral spreading of the radio signal and potential interference with other radio channels. Thus, the prior art modulation comprises filtering of the digital waveform to round-off the transitions between ‘1’ (+1) and ‘0’ (−1). In extreme cases known as partial response signalling, over-filtering is used to reduce the amount of spectrum used by a signal for its transmission. Filtering is used to obtain desired characteristics in the spectral domain, but can be achieved either with spectral domain filters such as may be constructed with resistors, inductors and capacitors or may be achieved by processing in the time domain using time samples. An archetypical time-domain filter is known as the transversal filter or Finite Impulse Response (FIR) filter. Other prior art time domain filters are known as Infinite Impulse Response filters (IIR).

An FIR filter comprises one or more delay stages for delaying the signal to be filtered forming a tapped delay line. When signals are already in the form of sequential numerical waveform values, such a tapped delay line may be formed by storing samples sequentially in a digital memory device. Samples delayed by different amounts are then weighted and added to form the filtering characteristic. Such a filter, when employed to filter digital waveforms, generally produces several output values per input data bit so as to correctly represent the shape of the 1–0 transitions which are important in controlling the spectrum to the desired shape. These values are no longer +1 or −1, but any value in between. Thus, premodulation filtering has the effect of changing single-bit information values to a plurality of multi-digit values.

In prior art beamforming methods, the filtered, multi-valued modulation waveform is applied to a digital beamformer 13. The digital beamformer forms M differently complex-weighted combinations of the modulation waveforms, which when modulated on to an appropriate radio frequency carrier and applied to corresponding antenna array elements, will result in each modulated signal being radiated in a separate, desired direction. The in-general complex numerical outputs of the beamformer are DtoA converted using, for example, a DtoA convertor for the real component followed by a smoothing or anti-aliasing filter to produce a continuous waveform between samples, and a similar device for the imaginary part. The DtoA converted waveforms are known as I,Q waveforms, and are applied to an I,Q modulator (or quadrature modulator) which impresses the complex modulation on a desired radio carrier frequency. The DtoA conversions anti-aliasing filtering and I,Q modulator are represented by blocks 14 of FIG. 1.

The prior art beamformer thus forms M combinations of the N input signals' samples by means of an MxN matrix multiplication with a matrix of combining coefficients. For example, suppose M=320 and N=640; then for each input signal sample period, 204800 complex multiply-accumulate operations have to be performed. A typical coded digital speech signal may be represented by a modulation waveform of 10 KHz bandwidth, which, if sampled at 8 samples per cycle of bandwidth in order to accurately represent 1–0 transitions, leads to 80 k complex samples per second from each modulation waveform generator 12. Thus the number of complex operations per second that digital beamformer 13 must execute is 80000×204800=16,384,000,000.

Instruction execution speeds of digital signal processing devices are measured in Mega-Instructions Per Second or MIPS. Thus, 16384 MIPS of processing are required. A complex multiply-accumulate consists however of 4 real multiply-accumulates in which DSP power is normally measured. Thus, the number of real MIPS required is thus 65536, or with allowance for overhead, >100,000.

A state of the art digital signal processor such as the Texas Instruments TMS32OC56 executes about 40 MIPS. Thus, 2500 devices are needed for the postulated 320-input, 640-output beamformer. This may also be expressed as 8 DSP's per voice channel. As state of the art DSPs are expensive, the use of 8 DSPs per voice channel raises the cost of providing communications infrastructure which is measured in terms of cost per installed voice channel.

SUMMARY OF THE DISCLOSURE

It is therefore an objective of the invention to provide digital beamforming and spectrally controlled modulated output signals at a reduced cost per voice channel, which may be achieved by practicing the invention according to the following description and drawings. The present invention relates to a beamforming network which is adapted for transmitting N digital information streams using M antenna elements. The N digital information streams are represented by binary 1's and 0's, or in arithmetic units, by +1 or −1. These unfiltered digits form the inputs to the inventive beamformer, which no longer have to perform multiplication. Furthermore, precomputed sums and differences may be stored in look-up tables addressed by groups of bits of the information streams, in order to save computational effort. Since the beamforming network performs a linear operation, filtering of the digital information waveforms in order to delimit the transmitted spectrum can be performed on the output signals rather than the input signals, thus permitting the simplification of the beamforming process.

According to one embodiment of the present invention, a digital beamforming network for transmitting a first number of digital information signal using a second number of antenna array elements is disclosed. Assembling means are used for assembling one information bit selected from each of the information signals into a bit vector. Digital processing means have an input for the bit vector and a number of outputs equal to the second number of antenna elements and process the bit vector. Finally, modulation waveform generation means coupled to each of the second number of outputs generate a signal for transmission by each antenna element.

According to another embodiment of the present invention, a digital beamformer for transmitting a first number of digital information streams using a second number of antenna array elements is disclosed. The beamformer has selection means for selecting one information bit at a time from each of the information streams and assembles them to form a real bit vector and selects another information bit from the information streams to form an imaginary bit vector in a repetitive sequence. Digital processing means repetitively process the real bit vectors alternately with the imaginary bit vectors to obtain for each of the second number of antenna elements a first real and a first imaginary digital output word related to each real bit vector and obtains a corresponding number of second real and second imaginary output words related to each imaginary bit vector. Switching means selects the first real digital output words alternating with the second imaginary output words to produce a stream of real OQPSK modulation values and alternately selecting the second real digital output words alternating with first imaginary output words to produce a stream of imaginary OQPSK modulation values. Modulation waveform generation means process for each of the antenna elements the real and imaginary OQPSK modulation values to obtain a corresponding OQPSK modulated radio waveform.

BRIEF DESCRIPTION OF THE DRAWINGS

These and other features and advantages of the present invention will be more readily understood upon reading the following detailed description in conjunction with the drawings, in which.

DETAILED DESCRIPTION

Figure 1:
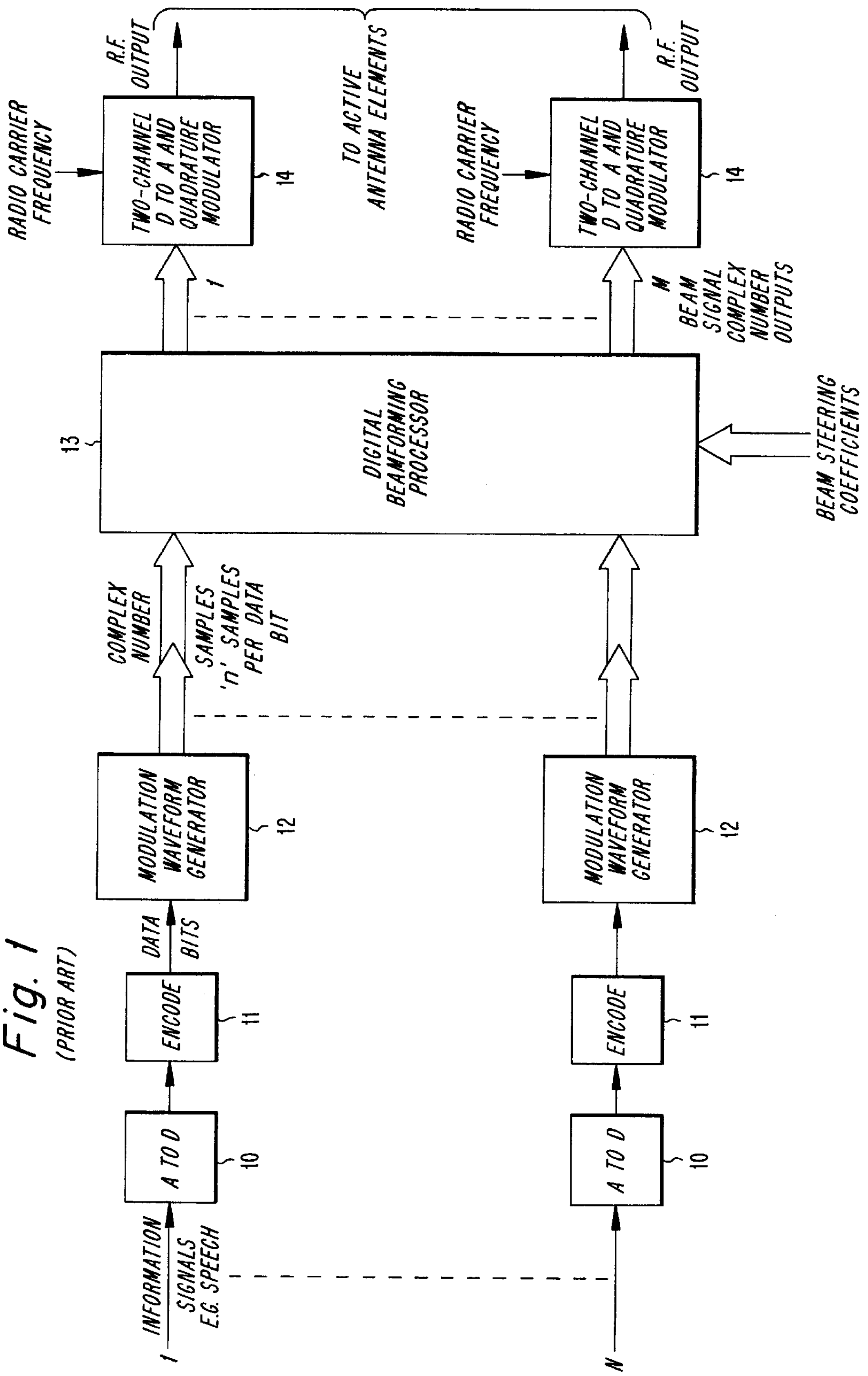
Fig. 1 (PRIOR ART)
FIG. 1 illustrates a prior art multiple beamforming network.
Figure 2:
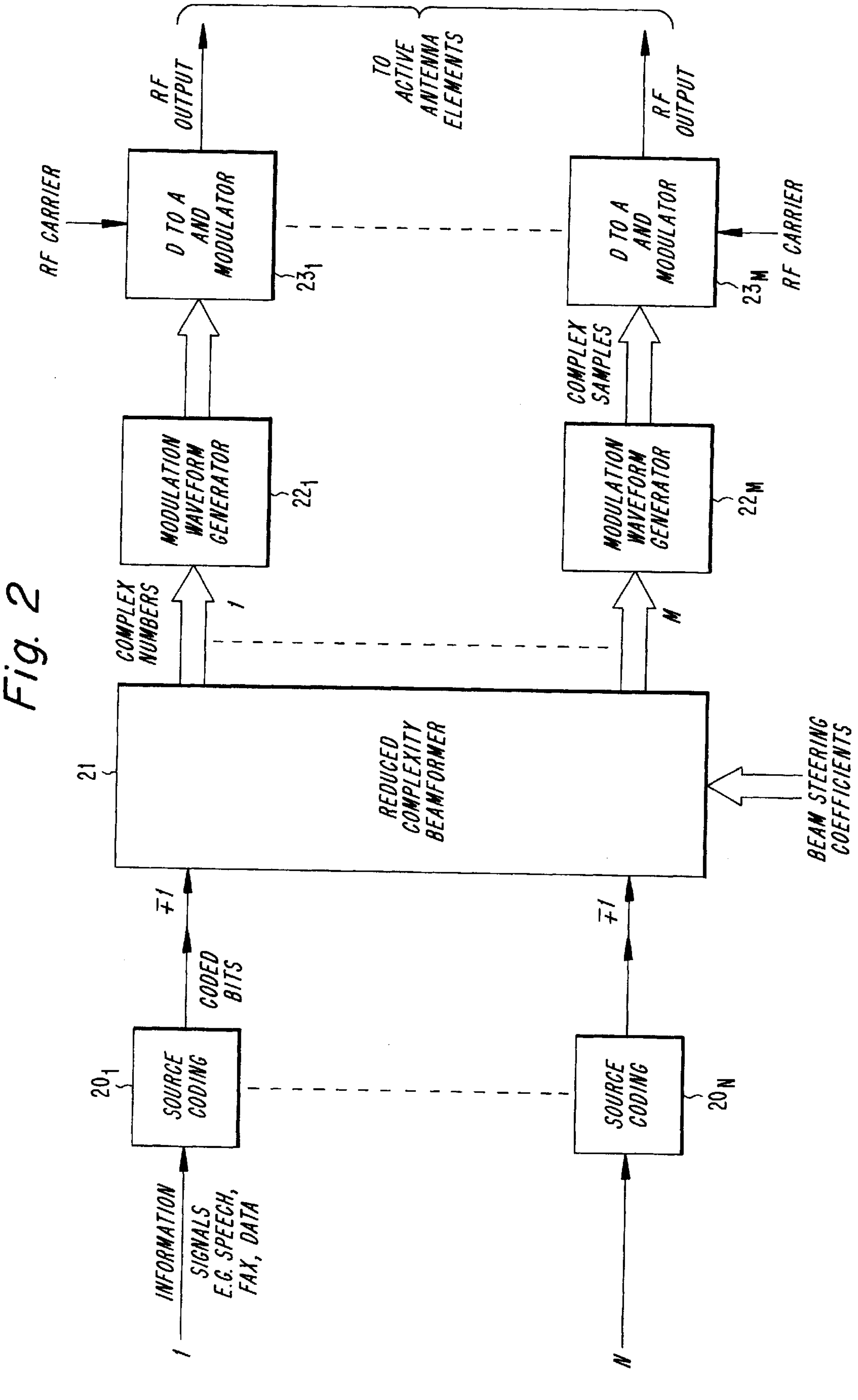
FIG. 2 illustrates a beamforming network according to one embodiment of the present invention.

The inventive beamformer is illustrated in FIG. 2. The Analog to Digital conversion (FIG. 1 (10)), voice coding and error correction coding (FIG. 1 (11)) have been abbreviated to the source coding block 20 of FIG. 2. Source coding comprises reducing analog voice, pictures, documents for faxing or any other form of information to a digital bitstream for transmission, and may comprise AtoD conversion, data compression to remove redundancy and error correction and/or detection coding to improve transmission reliability.

The output of the source coding may be represented arithmetically as a sequence of +1 or −1's at the rate of one such number per information bit. This is a much simpler sequence than is produced by the modulation waveform generator 12 of FIG. 1. Typically, the latter produces 8 multi-bit complex numbers per data bit, because it filters the digital data waveform for transmission to constrain the spectral occupancy. The present invention relies on the principle that the beamforming network performs a linear operation, and that the modulation waveform generation is a linear operation, and thus their order can be reversed. According to the present invention, modulation waveform generation is performed after beamforming, thus avoiding an expansion from one single bit value per information bit to several multi-bit values ahead of the beamformer. Thus, the beamformer has to perform operations at typically ⅛ th of the rate. Instead of multpilication, the beamformer only has to perform N additions or subtractions (according as an input bit is +1 or −1) of an associated predetermined beamforming coefficient. For example, if the beamforming coefficients for signal i's desired transmit direction are c1i,c2i,c3i . . . cmi, and the bits for signals i=1,2,3,4 . . . n are +1,−1,+1,+1 . . . +1, then the beamforming network must calculate:

EQUATION SET 1

$c11 - c12 + c13 + c14 \ldots c1n$ for array element 1

$c21 - c22 + c23 + c24 \ldots c2n$ for array element 2 and so on.

The +/− sign pattern in forming the combinations corresponds to the data bit polarities at the input. If each cik is in general a complex number, the above represents 2 nm additions or subtractions compared to the 4 nm multiply-accumulates of FIG. 1. Moreover these need only be performed at typically ⅛th the rate, a total saving factor of 16. This translates into a cost per voice channel reduced from 8 DSPs to 0.5 DSPS, which is affordable.

Before continuing to explain how even greater saving may be achieved by the use of precomputed look-up tables, the function of the modulation waveform generator 22 which is now placed after the beamformer will be explained. When linear modulation is used, data bit waveforms are filtered to contain spectral occupancy and then modulated on to a radio frequency carrier using for example AM, PSK, QPSK, DQPSK, OQPSK, etc. Linear modulations give rise to a varying radio frequency amplitude as well as a varying phase, whereas non-linear modulations such as FM, PM, FSK, MSK, GMSK, CPFSK and the like are used when it is desired to maintain a constant amplitude signal that is modulated only in phase. The latter may be preferable for transmitting a single information stream, such as in a digital mobile phone, because constant envelope transmitters can operate at greater efficiency. In an active phase array transmitting a multiplicity of signals, the composite signals transmitted by each element are inevitably of varying amplitude and phase, and it is thus no disadvantage, to use the more spectrally efficient linear modulation methods which require varying the amplitude.

Figure 3A:
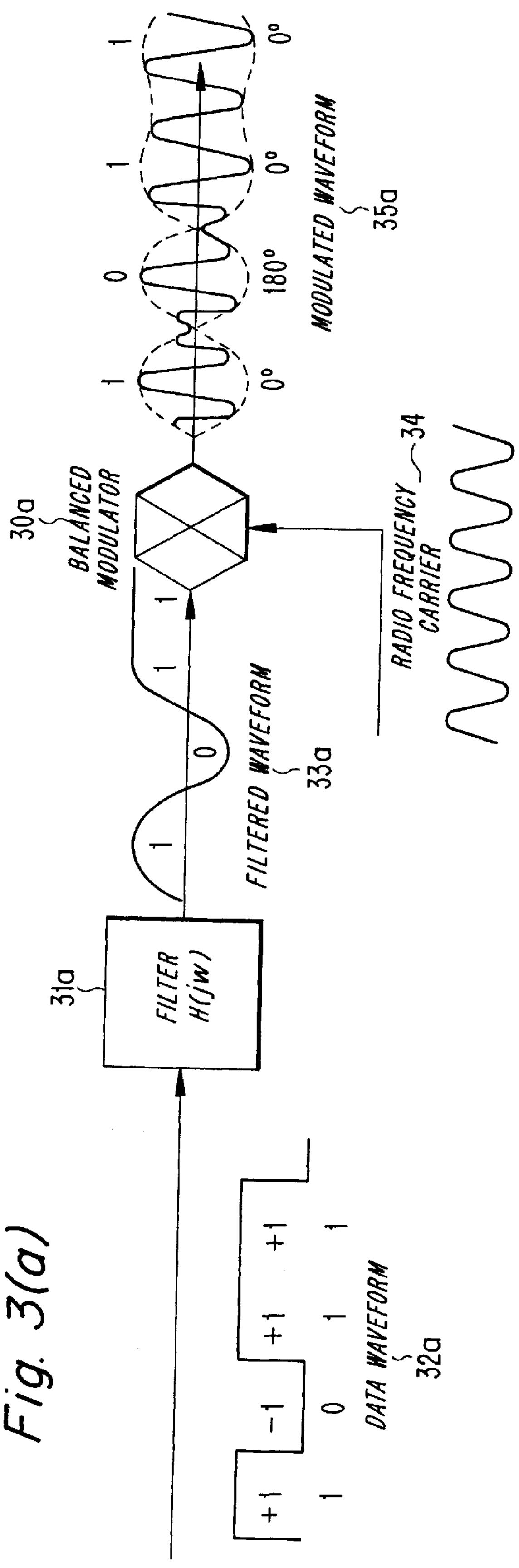
FIG. 3 illustrates generating filtered PSK according to a known method.
Figure 3B:
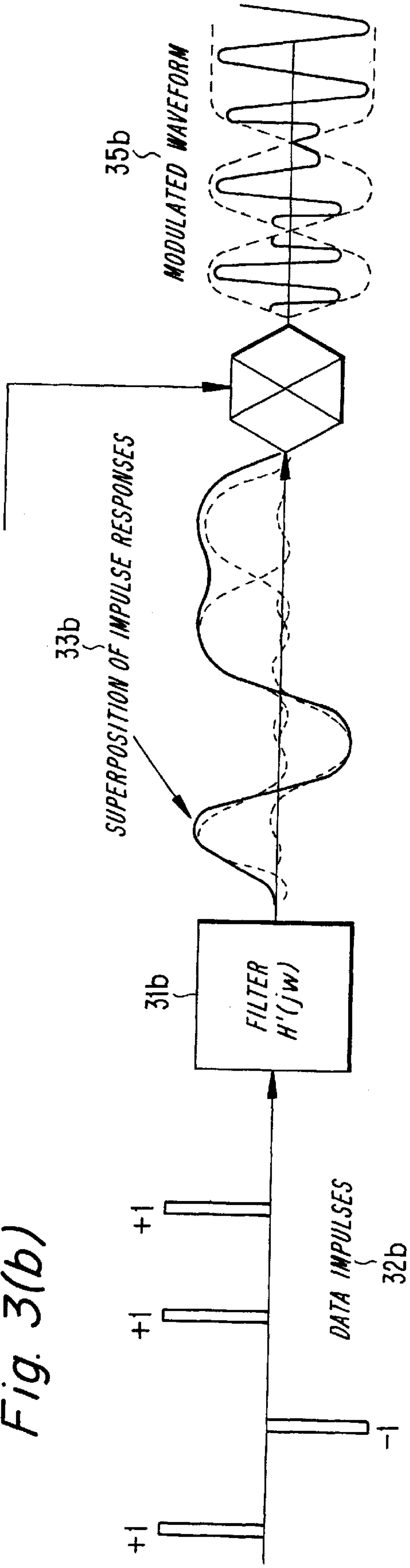

The simplest linear modulation method for digital information is PSK. PSK is effectively Double Sideband Suppressed Carrier amplitude modulation (DSBSC) of the radio carrier wave with the filtered bitstream. FIG. 3*a* shows the waveforms used for generating filtered PSK with a known balanced modulator 30*a*. An unfiltered data waveform 32*a* is applied to a bandwidth-restricting, low-pass filter 31*a* producing filtered waveform 33*a*. The filtered waveform multiplies the radio frequency carrier 34 in balanced modulator 30*a* to produce modulated waveform 35*a*. In the modulated waveform, the RF carrier wave has been inverted 180 degrees in phase for periods when the filtered waveform is negative, corresponding to binary '0's in the original data stream. A currently more fashionable approach to modulation is shown in FIG. 3*b*. The data bit waveform is regarded as a series of impulses 32*b* of + or − sign instead of a flat-topped square wave 32*a*. These impulses are applied to shock-excite a filter 31*b* that rings in response to each impulse in a characteristic way known as the impulse response. Since the filter is linear, the output waveform 33*b* is the linear superposition (addition or subtraction according to the sign of the data bit) of the impulse responses produced by each data impulse. This waveform then modulates RF carrier 34 as before using balanced modulator 30*b* to produce modulated radio wave 35*b*. Waveforms 33*b* and 33*a* are similar, as are waveforms 35*a* and 35*b*. The systems of FIGS. 3*a* and 3*b* are in fact identical when the filter frequency responses H(jw) and H'(jw) are related by:

$$H'(jw) = H(jw) \cdot \frac{\mathrm{SIN}(wT)}{wT} \quad \text{where } T \text{ is the data bit period.}$$

Modern theory contends that impulse responses H'(jw) that are not constrained to contain a Sin(wT)/wT factor can be made more desirable. The advantages are a better spectral containment without reducing communications efficiency through overfiltering, and better demodulation algorithms are possible through being better able mathematically to model the transmission process as the impulse response of a transmit filter, propagation channel and receive filter combined. Furthermore, if this combined channel has the Nyquist property, which means that its combined impulse response has zero-crossings at multiples of the data bit period away from the peak, then the received signal, when sampled at the correct instants, will reproduce the data bit polarities without corruption due to smearing of neighboring values, i.e., without Intersymbol Interference (ISI). A common design technique is to ensure that, at least for an ideal propagation channel, the combined impulse response of the transmit and receive filters is Nyquist. An arbitrarily equal allocation of the overall Nyquist response is then made to the transmit and receive filters respectively, so each are assumed to have the square root of the Nyquist filter's frequency response. The transmitter filter may be made root Nyquist, but there is in practice less control over the receiver IF filters. Nevertheless, the deviation from root-Nyquist at the receiver is simply modelled as a linear imperfection introduced by the propagation channel and can be compensated by an equalizer of known type.

Advantageous means exist for numerically generating modulation waveforms of data impulses filtered by a root-Nyquist filter or indeed any filter. The design process is as follows. Once the desired Nyquist filter response is chosen, the square root of its frequency response is calculated. Then, the impulse response of the root-Nyquist filter may be calculated by Fourier transforming its frequency response. The impulse response is in general a continuous waveform, but it can be represented adequately by a number of sample values greater than twice the maximum frequency at which its frequency response is non-zero and still significant. In practice, the sample rate used is expressed as a multiple of the data bitrate and is chosen to make the smoothing filter needed to smooth the samples waveform as simple as possible. It is desirable that this filter, which must be a continuous time filter constructed with analog components, be of broader bandwidth than the desired root-Nyquist response so that tolerances in its cut-off frequency do not affect the overall response, which should be dominated by the accurate digitally generated root-Nyquist characteristic.

Figure 4:
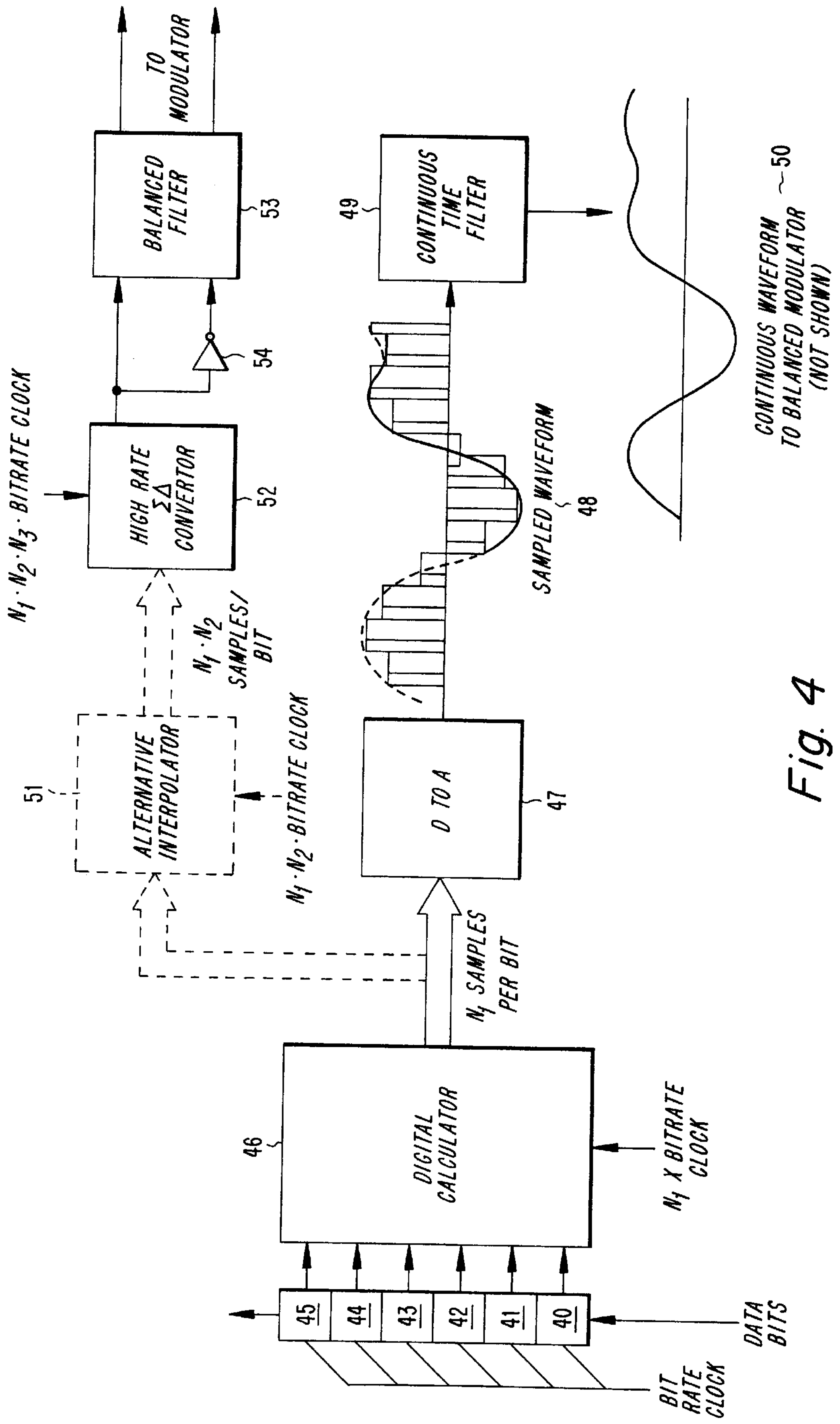
FIG. 4 illustrates a numerical generation of filtered modulated waveforms.

The scheme for numerically generating filtered modulation waveforms is illustrated in FIG. 4. Data bits are clocked into shift register cells 40 . . . 45 and bits delayed by 1,2,3,4,5 or 6 bit periods are made available from taps on the shift register to digital calculator 46. For each shift, the digital calculator computes:

EQUATION SET 2

$$
\begin{aligned}
S0 &= b1\cdot F(-3T) + b2\cdot F(-2T) + b3\cdot F(-T) + b4\cdot F(0) + b5\cdot F(T) + b6\cdot F(2T)\\
S1 &= b1\cdot F(-2.9T) + b2\cdot F(-1.9T) + b3\cdot F(-0.9T) + b4\cdot F(0.1T) \ \ldots \ b6\cdot F(2.1T)\\
S2 &= b1\cdot F(-2.8T) + b2\cdot F(-1.8T) + b3\cdot F(-0.8T) + b4\cdot F(0.2T) \ \ldots \ b6\cdot F(2.2T)\\
\vdots &= \vdots \qquad \vdots \qquad \vdots \qquad \vdots \qquad \vdots\\
S8 &= b1\cdot F(-2.2T) + b2\cdot F(-1.2T) + b3\cdot F(-0.2T) + b4\cdot F(0.8T) \ \ldots \ b6\cdot F(2.8T)\\
S9 &= b1\cdot F(-2.1T) + b2\cdot F(-1.1T) + b3\cdot F(-0.1T) + b4\cdot F(0.9T) \ \ldots \ b6\cdot F(2.9T)
\end{aligned}
$$

where F(t) is the impulse response of the desired filter at a time 't' away from the peak, T is the bit period, and the above assumes that 10 waveform samples per bit period are to be computed (i.e. N1 of FIG. 4 is equal to 10). If 8 samples per bit had been desired, then the arguments of F(t) would have been incremented in steps of T/8 instead of O.1T.

Since the impulse response F and the times at which its value is needed to calculate the above are known in advance, all the 60 F values in the above formulas may be precomputed and stored in a look-up table or read-only memory. Even better, because the data bits b1. . . b6 can only jointly take on 64 different combinations, each value SO . . . S9 can only take on one of 64 possible combinations of the F values, the combinations of which can then be precomputed and stored in a table of 64 values for SO, 64 values for S1 . . . and so on, a total of 640 values. This is a relatively small Read Only Memory (ROM) by today's standards, so it is possible to obviate calculation altogether by substituting a ROM table for digital calculator 46 which is addressed by shift register 40 . . . 45.

The output from the digital calculator 46 is thus a stream of N1 values per data bit. This may be applied to a DtoA convertor 47 to generate a corresponding sequence of analog samples 48. This waveform has discontinuities between samples that must be smoothed out to avoid spectral spreading of the transmission. The discontinuities occur however at the relatively high frequency of the sample rate which is N1 times the bitrate. Therefore, they may be filtered out by a continuous time filter 49 with a frequency response that cuts off at several times the bitrate, and thus does not affect the frequency response in the region around the bitrate that we are attempting to accurately define. Any small residual effect that filter 49 may have on the overall root-Nyquist response can be taken into account in precomputing the F-coefficients defined above. The F-coefficients can for example be computed from the impulse response of the desired root-Nyquist filter times an approximate inverse of the filter 49.

An advantageous alternative technique shown by blocks (51 . . . 54) is disclosed in U.S. Pat. No. 5,745,523 and U.S. Pat. No. 5,530,722 which are both hereby incorporated by reference.

The N1 samples per bit produced by the digital calculator 46 is subjected to a first stage of mutation towards a continuous waveform by filling in extra samples between the original samples using a digital interpolator 51. This may for example be a simple linear interpolator that simply draws a straight line between original samples in order to estimate the value of intervening samples. Samples at the interpolated rate are then applied to a high bitrate Sigma-Delta convertor 52, which represents the waveform as the proportion of 1's to 0's in a much higher bitrate stream. The inverse of this bit stream is also formed by an invertor 54 and the stream and its inverse are applied to a balanced (push-pull) continuous-time filter arrangement 53 to generate the desired continuous waveform. One advantage of alternative arrangement (51 . . . 54) is the elimination of the DtoA convertor 47, and other advantages are discussed in the aforementioned applications incorporated above.

A modified arrangement similar to FIG. 4 can be employed to implement modulation. The modification is required because the input quantities to the post-beamforming modulator have been transformed into multi-bit complex values by the combinatorial beamforming operation and are no longer single bit values as in FIG. 4.

Figure 5:
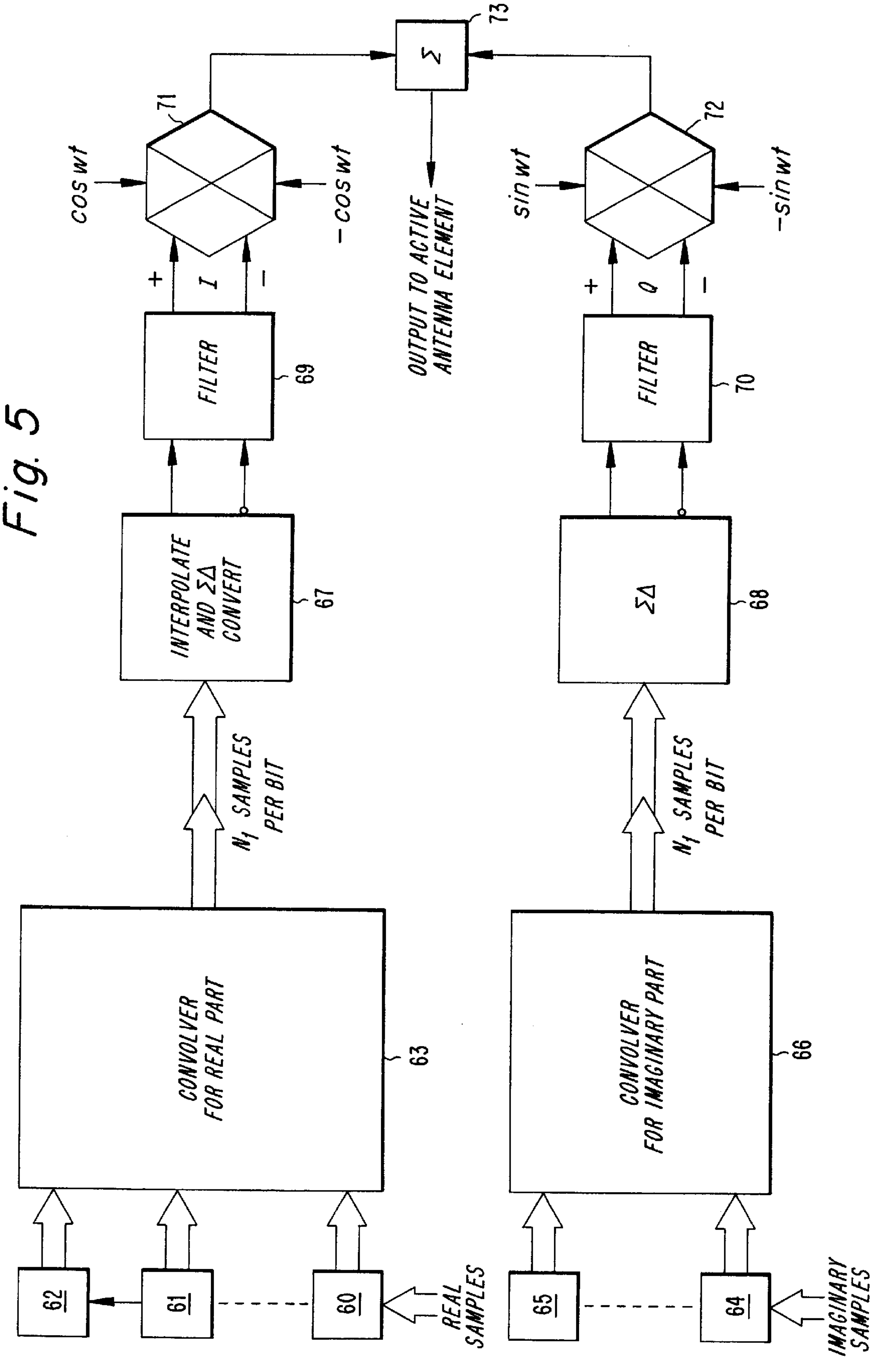
FIG. 5 illustrated an implementation of the waveform generator illustrated in FIG. 2.

FIG. 5 illustrates the modified waveform generator. A sample stream comprising the real parts of the complex number stream from one output of beamformer 21 is delayed in a series of memories (60 . . . 61,62) corresponding to the length of the impulse response of the transmit filtering desired. A convolver 63 forms N1 output samples per input sample shifted into delay elements 60 . . . 62 by computing equation set 2 substituting for b1 . . . b6 the multi-bit input values from the delay elements. This now involves full multiplications as b1 . . . b6 are no longer just +/−1. However, the number of multiplications needed to implement the filtering operation is much less than the number needed to implement beamforming. Therefore, it is advantageous to simplify beamforming at the expense of modulation filtering complexity. A convolver 66 is identical to the convolver 63 and deals with the imaginary part of the complex number stream from an output of the beamformer 21. Those skilled in the art of digital design will recognize the possibility to time share a single convolver between real and imaginary operations for further simplification. The multiplications performed by the convolvers 63 and 66 are moreover with fixed constants unlike the multiplications performed by the beamformer 21, assuming the beams are to be dynamically steered by varying the coefficients. Thus, a simpler piece of digital hardware can be constructed to perform convolving with fixed constants than matrix multiplication with variable quantities.

The output values from convolvers 63 and 66 comprise a complex number stream at an elevated sample rate of N1 samples per original data bit period. These samples are converted to analog waveforms for modulating the radio wave by the Interpolation and Sigma-Delta technique described above, using convertors 67 and 68 and balanced filters 69 and 70. The balanced I,Q waveforms are applied to balanced I,Q modulators 71, 72 and 73 along with cosine and sine waveforms at the radio carrier frequency to obtain a signal for transmission by a phased array element (not shown).

Further simplifications of the beamforming network 21 that are possible when input values are only +1 or −1 (binary 1's and 0's) will now be explained. The equation set 1 describes the computations to be performed. It is in fact identical to the equation set 2 when, instead of the determined signs, multiplication by +/−1 according to the data bit polarity is shown as in the equation set 2. Thus, the expression for array element 1's unfiltered signal becomes:

$$E1=b1 \cdot c11+b2 \cdot c12+b3 \cdot c13+b4 \cdot c14 \ldots +bn \cdot c1n \text{ for array element } 1$$

A subset of these terms, involving, for example, the eight bits b1 . . . b8, can only take on, in that example, 256 possible values as the 8 bits can have only 256 different combinations and the coefficients are fixed at least for a large number of sample computations. Thus all 256 possible values of $$b1 \cdot c11+b2 \cdot c2+b3 \cdot c13+b4 \cdot c14+b5 \cdot c15+b6 \cdot c16+b7 \cdot c17+b8 \cdot c18$$

may be precomputed and stored in the table T(b1,b2,b3 . . . b8), from which they can be retrieved by addressing the table with the 8-bit address b1,b2,b3 . . . b8. Since 65536-word semiconductor memories are single, low-cost components in today's technology, even the combination of 16 bits can be precomputed and stored. A very efficient means of precomputing such tables is to explore all 16-bit patterns by changing only one bit at a time, in so-called Grey-code counting order. Then each successive value computed is equal to the previous value plus or minus twice the value of the c-coefficient associated with the changed bit, an effort of only one add/subtract per computed value.

A similar table may be computed for bits 17 . . . 32; 33 . . . 48 and so-on. Finally, with such tables, E1 is computed from:

$$E1=T1(b1 \ldots b16)+T2(b17 \ldots b32)+T3(b33 \ldots 48) \ldots$$

The number of additions required has thus been reduced in this way by a factor of 16. The addition of the outputs of the tables may be performed by combining them in pairs using a binary tree structure and serial arithmetic adders, as shown in FIG. 6.

A group of 16 data bits b1 . . . b16 is applied as an address to a precomputed RAM table 80. An 8-bit real and an 8-bit imaginary value are obtained. A similar precomputed partial sum is obtained from a RAM table 81. The real and imaginary values are serialized by parallel-serial convertors 83, 84, 85, and 86 for application of the values bit serially to serial arithmetic adders 87 and 88. The sum R1+R2, I1+I2 appears as a serial digital value from adders 87,88 and is combined in turn with a further sum in a tapering adder tree until the final stage 89 and 90 completes the calculation of E1. The advantage of serial arithmetic for addition of multiple values is simple implementation using integrated circuit technology, and no throughput delay, as disclosed for calculating Fast Walsh Transforms in U.S. Pat. No. 5,357,454 which is hereby incorporated by reference.

Figure 6:
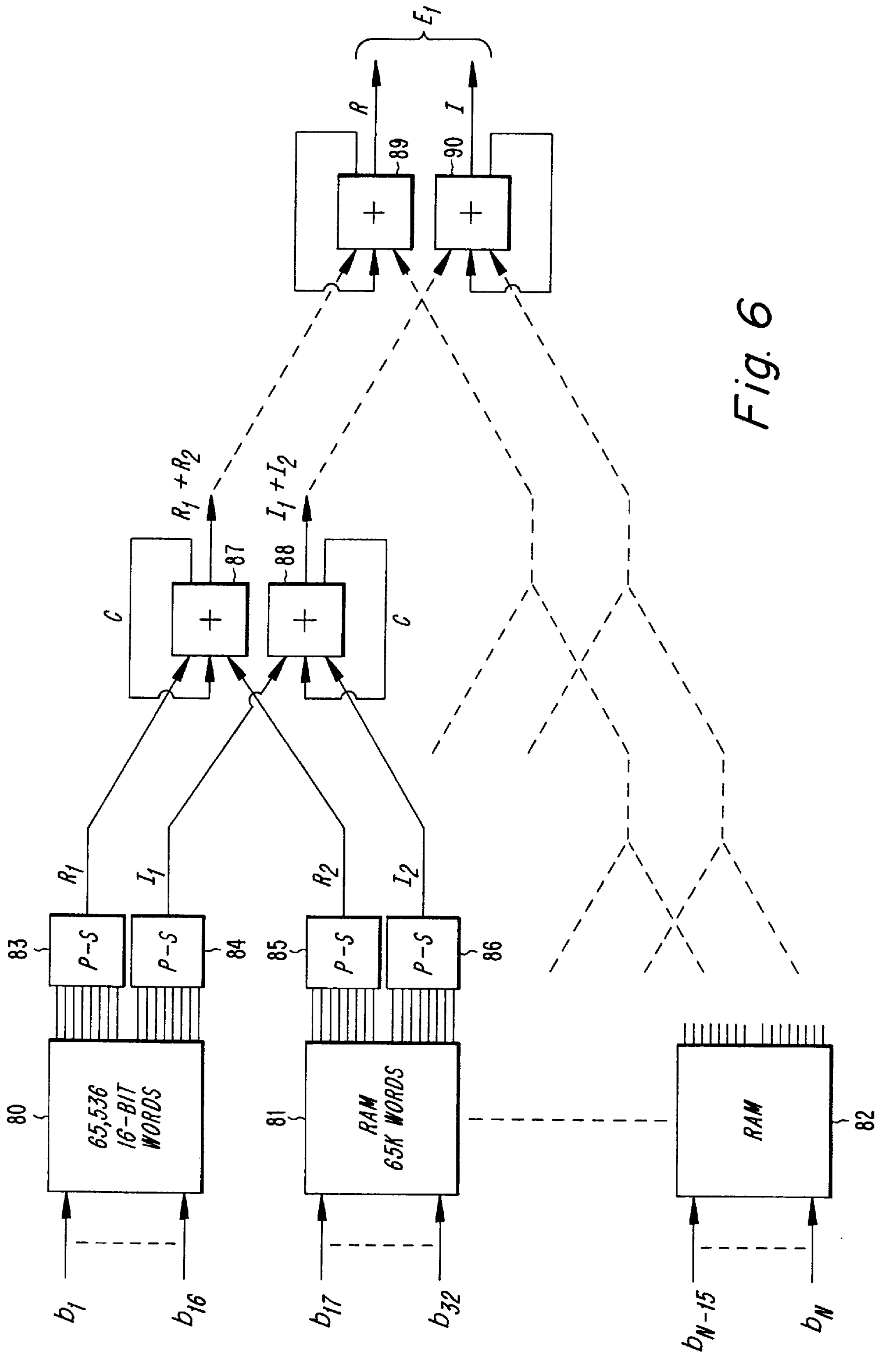
FIG. 6 illustrates beamforming using precomputed look-up tables.

Recalling that the data rate per channel originally mentioned for coded speech was in the neighborhood of 10 KB/S, the network illustrated in FIG. 6 only needs to calculate an output value every 100 uS. This is an extremely slow speed for accessing memory tables, which are capable of much higher speeds, for example 10 megawords per second. One method of capitalising on the excess speed available is to use FIG. 6 for a TDMA system in which perhaps 1024 speech bit streams are time-multiplexed into 10 MB/S bitstreams. Thus, the number of signals the network handles is 1024N. If the coefficient tables are the same for every timeslot, it means that the N TDMA signals are radiated in the same set of directions for all timeslots. Other structures will be disclosed that can vary the directions on a timeslot-by-timeslot basis.

For example, a 256-beam system using 512 phased array elements can be constructed according to FIG. 6 using sixteen, 65 kword memories for forming each array element signal, a total of 16×512=8192 memory chips. Note however that this can handle 256 signals in each of 1024 timeslots of a TDMA frame, thus the capacity is 262,144 voice channels and the complexity per voice channel is 8192/262144=1/32 nd of a RAM chip per voice channel. This indicates the economic possibility to construct very large phased array communications systems for very high capacity communications systems.

Figures 7, 8:
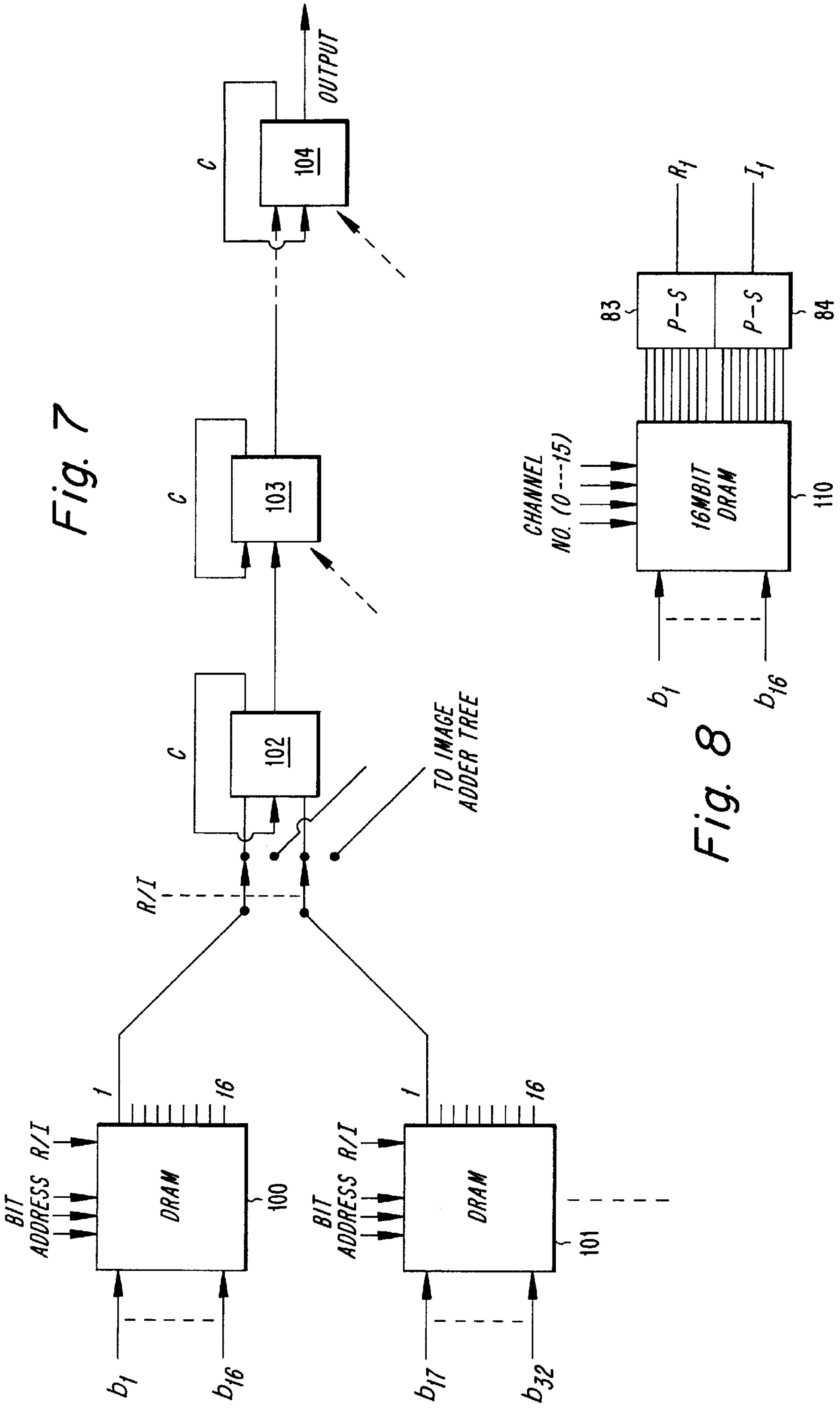
FIG. 7 illustrates the use of 16 megabit DRAMs for beamforming according to one embodiment of the present invention.
FIG. 8 illustrates a DRAM for forming staggered interstitial beams between different channels.

A different way of utilizing the excess memory speed available in FIG. 6 is shown in FIG. 7. Dynamic RAM chip sizes become ever larger driven by commercial competition in the computer market. The 16 megabit DRAM is now on the verge of commercial production. It is assumed in FIG. 7 that 16 megabit DRAMs will be available organized as 220 16-bit words, having thus 20 address pins and 16 data pins. A DRAM 100 is used to hold precomputed combinations of signals b1 . . . b16 for 16 array elements. The precomputed values are stored as serial values occupying one bit, for example the least significant bit, of 8 consecutive words to represent an 8-bit real part and the next eight consecutive words for an 8-bit imaginary part. Another bit of those same words (for example the 2 nd least significant bit) stores similar information for array element 2, and so-on. Each 16-bit word thus contains one bit of a real or imaginary value for 16 array elements. A bit of an 8-bit real value is addressed by the three "bit-address" lines while the real or imaginary part is selected by the R/I address line. By using these address lines, the 8 bit real value can be serially output followed by the 8-bit imaginary value. Serial values are obtained in this way without the use of the parallel to serial convertors 83 to 86 of FIG. 6, and for 16 array elements simultaneously. The DRAMs 100,101 are addressed thus 16 times faster than in FIG. 6, namely at 16 times the coded speech bitrate, or around 160 kilowords/sec. This is still well within the speed of DRAMs.

A corresponding pair of serialized partial sums is now extracted from pairs of DRAMs, for example 100 and 101, and combined in a serial adder 102. The serial output of the adder 102 is further combined with a similar output in an adder 103 and so-on through the binary tree to the final output from an adder 104.

When all 8 bits of the real values have been added, the inputs to the adding tree 102,103 . . . 104 are frozen at the last bit polarities, which are the signs of the values, and clocks continue to be applied to the adder tree to clock through carry propagation, which forms the most significant bits of the sum output. During this time, the imaginary values are clocked out of the DRAMs 100,101 and are added in a second adding tree (not shown) for the imaginary parts.

A system of 256 signal inputs and 512 array elements constructed according to FIG. 7 uses 16 DRAM chips plus a serial adder tree to form signals for 16 array elements, thus 32 such structures are required for all 512 elements, a total of 512 DRAM chips. This represents a complexity of 2 DRAM chips per voice channel, but they are not at all used at full speed. The addressing speed may be increased by a factor of 64 from 160 kilohertz to 10 megahertz, thus allowing re-use of the structure for 64 timeslots, giving a capacity of 64×256 voice channels and a complexity of 1/32 nd of a DRAM per voice channel, as before. The RAM chips are however much bigger, i.e., 16 megabit chips compared with the 1 megabit chips of FIG. 6. This permits the elimination of the parallel-serial convertors of FIG. 6, but this may or may not be an economic trade-off. Many factors influence this trade-off such as the number and total area of printed circuit board for mounting 8192 chips as in FIG. 6 with the equivalent packaging cost of 512 chips for FIG. 7. The trade-off also depends on whether a wideband, 1024-timeslot TDMA system is desired, or a narrower band TDMA system with fewer slots is desired. It is of course also possible by one skilled in the art of digital design to adapt the present invention to time share the beamforming hardware for forming beams on different carrier frequencies instead of different timeslots, thus taking advantage of the excess speed available with FIG. 6 over that needed to handle a single set of 10 kilobit voice signals. In that case, the set of beam directions formed are the same at all carrier frequencies using FIG. 6 hardware, as they were on all timeslots of a TDMA system. It can however be more desirable to form sets of beams that point in different directions for different timeslots or carrier frequencies. The use of such interstitial beams is described in U.S. Pat. No. 08/179,953, which is hereby incorporated by reference in its entirety. FIG. 8 shows adaptation of the invention to form different sets of beam directions for different "channels", where a channel may be a frequency, a timeslot, or a combination. Only that part of FIG. 6 equivalent to RAM 80 is shown adapted in FIG. 8, as it will be obvious to one skilled in the art how the adaptation may be carried to completion.

A 1-megaword×16-bit DRAM 110 contains partial sums for 16 data bits (16384 combinations) and for 16 different communications channels. The channel is selected by the remaining 4 address lines. The rest of the structure can be as in FIG. 6. In a 16-slot TDMA system, the first bits of all signals for transmission in a particular timeslot is applied to inputs b1 . . . b16 and to any other RAMs, while timeslot 0 (binary 0000) is applied to the other four address bits of every RAM. Successive data bits are then applied holding the channel select bits at 0000 until the end of the timeslot. Then the first data bits to be transmitted in the second timelsot are applied while the channel select bits are changed to 0001, and so on to channel 1111 at which point the sequence repeats. For a 256-beam, 512-element array, 8192 DRAM chips are used and timeshared by 16 timeslots. The complexity has thus increased to 2 DRAM chips per voice channel for the privilege of varying the beam directions from timeslot to timeslot. The available speed is however still under-utilized when only 16 timeslots are employed. If the number of timeslots is increased to better utilize the RAM speed capability, either it is necessary also to increase the RAM size above 16 megabits or to accept that some timeslots must use the same set of beam directions, as only 16 different sets of beam directions are available. This is however sufficient to achieve the objectives of U.S. Pat. No. 5,619,503 of only using each beam for communicating with stations located out to 25% of the beam −4dB radius from beam center.

Figure 9:
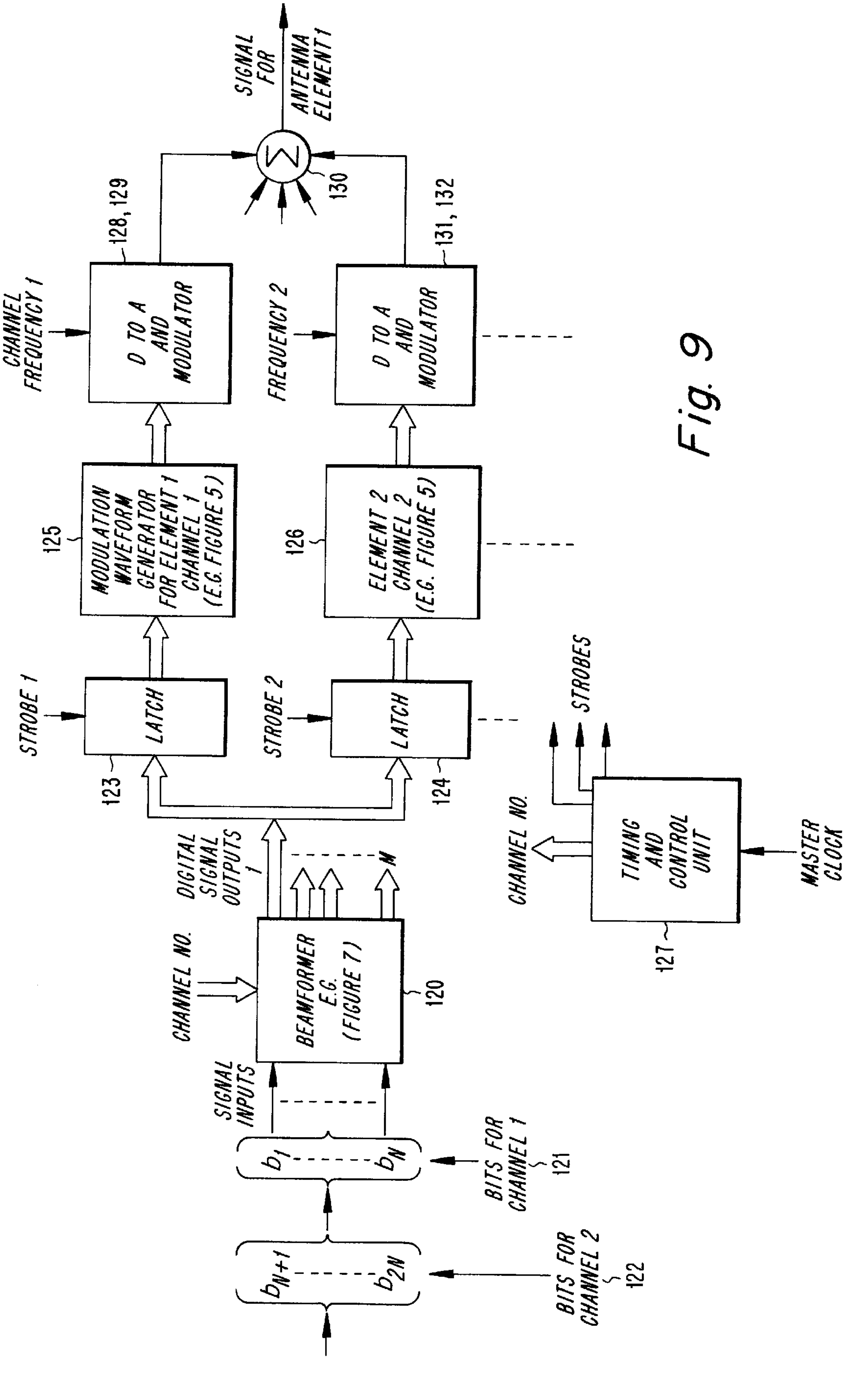
FIG. 9 illustrates timesharing the inventive beamformer between different frequency channels.

FIG. 9 illustrates how the inventive beamforming arrangement can be timeshared between different frequency channels, i.e., for an FDMA system. A beamformer 120 receives successively signal data bits 121 (b1,b2 . . . bn) for transmission in a set of beams formed on radio channel frequency 1, determined by setting the channel number address bits to 120 to channel 1. The antenna element signals in digital form are output from the beam former into a set of latches for channel 1 and control unit 127 toggles a strobe signal to cause the latches to register these values. FIG. 9 shows only the latch 125 for element 1 of channel 1. There are also latches (not shown) for element 2, 3, 4 etc all for channel 1 signals. The control unit then sets the channel number to 2 and a second set of bits 122 for transmission in a second set of beam directions on channel 2 is presented to beamformer 120. The outputs for channel 2 are latched in a second set of latches for channel 2, of which only the latch 124 for element 1 is shown. After cycling through all channel frequencies in this way, the control unit returns to calculate the next samples for channel 1, and so on. This latch 125 becomes set to successive channel 1 values, that then must be subjected to filtering using a modulation waveform generator 125 such as illustrated in FIG. 5. The filtered I,Q modulating values are then DtoA converted in converter 128 and modulated on to radio channel frequency 1 using an I,Q or quadrature modulator 129. A second filtered waveform generator 126 and DtoA converter 131 and modulator 132 deal with channel 2 signal for element 1. The outputs of 129,132, etc. for successive channel frequencies are then added to form a composite signal for transmission from element 1, and similar set s of equipment form corresponding signals for elements 2 . . . M.

It is desirable in a pure FDMA system with large numbers of channels and antenna elements to reduce the number of modulation waveform generators (125,126 . . . ) which would otherwise be equal to the product of the number of frequency channels and the number of antenna elements. Since in a pure FDMA system the bandwidth and therefore the bit and sample rate of each channel is much lower than a digital circuit, such as in FIG. 5, can handle, it is also possible to consider time-sharing the modulation waveform generators between channels. It is at least possible to time share the convolvers 63 of FIG. 5, which form FIR filters, by providing a separate set of registers (60 . . . 62) and (64 . . . 65) for each channel. The latch 123 is in fact the first stage (64 and 60) of such complex registers for channel 19 element 1, while latch 126 is the first of a bank of registers for channel 2. Thus by providing an array of latches/registers for each channel plus means to select all the latches associated with one channel as inputs to convolvers 63 and 66, it is possible to share the convolvers between channels. Whenever such an array of registers is required, a person skilled in the art will recognize that a Random Access Memory chip can represent a suitable implementation.

The number of DtoA converters and modulators may also be reduced by digital techniques. It is desirable to avoid a multiplicity of such analog circuits which are not so suitable for bulk integration on to integrated circuit chips.

The function of the modulators is to convert each channel signal to its own radio frequency and to add signals on different frequencies in summers 130. This Frequency Division Multiplexing may also be performed using high speed digital techniques. The task is to compute a sufficient number of samples per second of a sum such as:

So+1·exp(jdW·t)+S2·exp(j2dW·t)+S3·exp(j3dW·t) . . . +Sn·exp(jndW·t)

This expression can be alternatively written as:

So+exp(jdW·t)[S1+exp(jdW·t)[S2+exp(jdW·t)[S3+exp . . . ]. . . ]

where dW is the channel spacing in radians/sec, and n is one less than the number of frequency channels. The sequence of frequencies O,dW,2dW. . . ndW may alternatively be centralized instead between −ndW/2 and +ndW/2 by forming:

$$S_{-L}\cdot\exp(-jLdW\cdot t)+S_{-L+1}\cdot\exp(-j(L-1)dW\cdot t)\ldots+$$
$$S_{-1}\cdot\exp(-jdW\cdot t)+S_0+S_1\cdot\exp(jdW\cdot t)\ldots+S_{\underset{L}{L}}\cdot\exp(jLdW\cdot t)$$

where L =n/2 and n is assumed even.

This latter expression can also be written:

$$0.5[(S_{-L}+S_L)\cdot\cos(LdW\cdot t)+(S_{-L+1}+S_{L-1})\cdot\cos((L-1)dW\cdot t)\ldots+(S_{-1}+S_1)\cdot\cos(dWt)]+So+j0.5[(S_L-S_{-L})\cdot\sin(LdW\cdot t)+(S_{L-1}-S_{-L+1})\cdot\sin((L-1)dW\cdot t)\ldots+(S_1-S_{-1})\cdot\sin(dWt)]$$

Thus using the latter expression, by forming a cosine modulation (I-modulation) from the sum of a pair of channel signals and a sine modulation (Q-modulation) from the difference, the number of I/Q modulators may be halved. This technique, known as Independent Sideband Modulation (ISB) places one signal on a frequency negatively offset from center and another signal on the same frequency but positively offset from center. Such techniques generally result in imperfect isolation between channels due to hardware imperfections in modulators, such as carrier imbalance, imperfect quadrature between cosine and sine signals, and so-on. These techniques perform much better in a multi-element array context however, as the imperfections are not correlated from one antenna element channel to another, while the wanted signal components are. The unwanted signals thus tend to be radiated in random directions and a proportion of such imperfection energy is, in a satellite system for example, harmlessly radiated into space, missing the earth altogether.

The arguments of the complex exponentials such as LdW·t are computed at successively increasing values of t, and reduced modulo-2Pi. The increments of ‘t’ must comprise at least the Nyquist sampling of the carrier frequency LdW involved. This sampling rate can be greater than the sampling rate for the signals S1,S2, etc produced by convolvers 63 and 66, and so further upsampling of the channel signals must take place in the FDM process.

The above expressions may be recognized as a Fourier Transform. There are many ways to perform Fourier transforms numerically, such as the Discrete Fourier Transform and the Fast Fourier Transform. It is beyond the scope of this disclosure to describe all methods for digitally performing a frequency division multiplex, and it suffices to envision a digital FDM unit with a number of numerical input sequences at a first sample rate per channel comprising signals to be Frequency Division Multiplexed, and producing an output numerical sequence at a second, higher sample rate representing the multiplexed signal. The first, lower sample rate is that produced by per-channel, modulation waveform generators such as the upsampling convolvers 63 and 66 of FIG. 5, and the second, higher sampling rate is at least equal to the Nyquist rate for the highest frequency present in the FDM output.

The numerical FDM output, consisting of a stream of complex numbers for each array element, is then DtoA converted in I and Q DtoA convertors and applied to a single quadrature modulator per array element. The arrangement showing use of a digital FDM unit is given in FIG. 10. A timing and control unit 127 controls the successive presentation of bit vectors (b1 . . . bn); (b(n+1) . . . b2n) and so forth to timeshared beamformer 120 which can function in accordance with foregoing principles. Each bit in the bit vectors represents one bit from a communications channel, such as a voice channel, which are to be simultaneously transmitted using different directive beams and frequency channels. For example, if each of n frequency channels can be re-used for a different conversation in each of N different directions, a total of nN voice channels can be communicated simultaneously. The aforementioned bit vectors are formed by selecting one bit from each of said voice channels.

Figure 10:
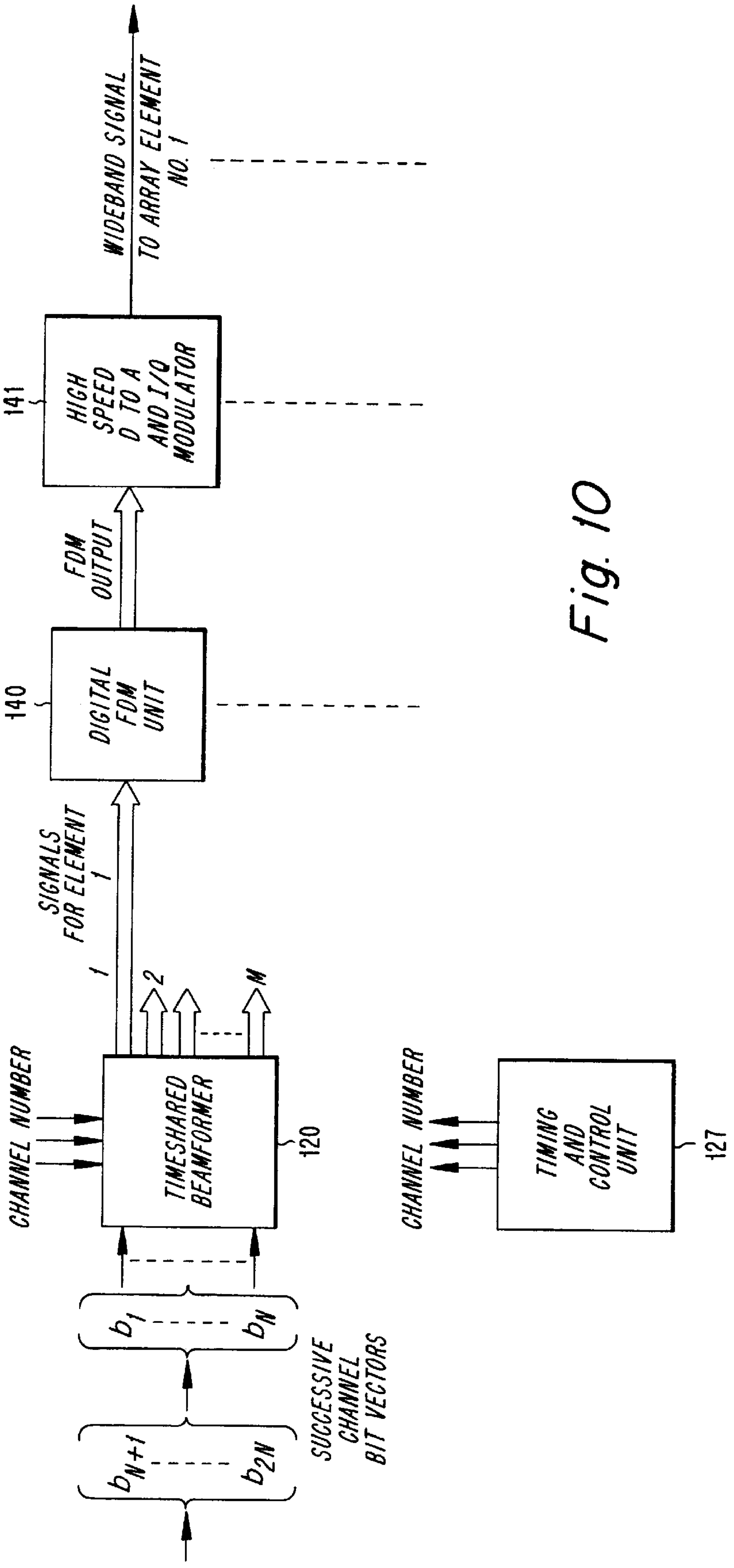
FIG. 10 illustrates a beamformer used in conjunction with digital frequency division multiplexing.

The beamformer combines N of the bits from first N channels to be transmitted on frequency 1 to obtain M array element output samples. Each sample is fed to an associated digital FDM unit 140. Only the FDM unit 140 for the first array element is shown in FIG. 10. The control unit 127 then causes the second bit vector to be presented to the beamformer 120 and simultaneously connects the channel number of frequency 2 to the channel address inputs of the beamformer 120. This causes generation of a set of element signals that will result in the second set of bits being radiated on a second frequency using a second set of beam directions. Successive presentation of bit vectors to the beamformer 120 along with appropriate channel numbers thus results, for each antenna array element, in a successive stream of corresponding complex output samples representing signals to be transmitted on different radio center frequencies. After one complete cycle of computation using all channel numbers once, the digital FDM unit will have stored the samples for each channel number and will calculate a corresponding FDM output sequence representing said samples translated to respective relative channel frequencies. By relative channel frequency it is meant that the absolute channel frequency, which may be in the several Gigahertz range, has been removed and the numerical sample stream represents the composite signal around a center frequency of zero, or a low frequency compatible with the digital FDM unit's computation speed. The FDM sample stream is then fed to a high speed DtoA convertor 141 where the sample stream is converted to I and Q modulation waveforms and modulated on to the desired radio frequency. It can of course first be modulated on to a suitable intermediate frequency which is then converted to a final frequency using an upconvertor. These details are a matter of design choice and are not fundamental to the present invention. The modulated, final-frequency signal may then be amplified to a desired transmit power level and fed to an array element. The power amplifier for this purpose may be integrated with the antenna array element.

The inventive beamformer described herein switches the usual order of the operations of “modulation waveform generation” and “beamforming” in order to simplify the latter. The simplification arises due to the sample rate and word length expansion that normally take place in a modulation waveform generator. Avoiding this expansion until after beamforming calculations are performed significantly reduces beamforming calculation complexity and allows the use of precomputed memory tables. The advantage of avoiding sample rate expansion before beamforming becomes even more evident when the invention is applied to a CDMA system. In a CDMA system, different signals are communicated not by allocating them different frequencies or different timeslots on the same frequency, but by allocating them different spreading sequences. A spreading sequence of a high bitrate is combined with an information stream of a low bitrate to deliberately spread its spectrum. Several signals using different spreading sequences are transmitted overlapping in both time and frequency. The receiver despreads a wanted signal making use of its known spreading code, thus compressing the signal to a narrowband signal once more. Other signals having different codes do not however become despread and remain wideband signals that are easily discriminated by means of filters from the narrowband wanted signal. Several different forms of CDMA are known in the prior art. Signals transmitted in the same cell at the same frequency and time can either use orthogonal codes, which theoretically allows them to be separated without residual interference between them, or can use non-orthogonal codes, which will exhibit some residual interference. Special receivers for non-orthogonal codes can decode signals while eliminating this residual interference, as described in U.S Pat. No. 5,151,919 and U.S. Pat. No. 5,218,619 which are both hereby incorporated by reference. Signals transmitted in different cells can re-use the same spreading codes, as cell-to-cell discrimination of the antenna system or a frequency/code re-use pattern prevents interference between them. Sets of beams formed on a given frequency or timeslot by practicing the current invention can be designed to permit such channel re-use. Thus, the same CDMA spreading code can be used across all beams, as the invention discriminates different signals by their assigned beam directions.

Considering now the prior art system illustrated in FIG. 1 applied to a CDMA system, modulation waveform generators 12 would spread the signal spectrum by applying a high-rate spreading code to each channel, thus expanding the number of samples per second necessary to represent it, For example, an original 10 kilobits/second digitally coded voice signal could be combined with a 1 megabit per second spreading code resulting in 1 megasamples/sec. Whether only one or several additively superimposed signals is presented to beamformer 13, it must now operate at 1 megasample/sec on each input. Using the current invention however, the modulation waveform generator 22 is placed after beamforming, and CDMA code spreading or Code Division Multiplexing (CDM) takes place there. The beamformer 21 therefore operates at a reduced sample rate and uses only single-bit input quantities.

In a CDMA application, bit vectors for transmission using different CDMA codes and beams may be presented successively to timeshared beamformer 120 of FIG. 10. Digital FDM units 140 are then replaced with CDM units, that apply the same spreading code to the M outputs of the beamformer 120 that emerge at the same time, and different spreading codes to outputs that emerge at different times. Successive outputs n from each output of the beamformer 120 are thus combined using different spreading codes to form a wideband signal that is then DtoA converted and modulated in a DtoA converter and modulator 141. The different spreading codes give discrimination between signals radiated in approximately the same direction, and can be orthogonal codes such as the Walsh-Hadamard set. Multiplexing different signals using orthogonal spreading codes will be recognized by those skilled in the art as performing a Walsh Transform, for which efficient fast algorithms exist that need no multiplications. Such a Code Division Multiplexer can thus be simpler than a Digital Frequency Division Multiplexer which is related to the Fast Fourier Transforms that need complex multiplications. A restriction imposed by the CDM structure just described is that the spreading code set used for different directions is the same. This gives the maximum complexity reduction of the beamformer 21. However, it is possible to construct a hybrid system in which partial spreading takes place before the beamformer 21 with final spreading afterwards. For example, the digitally coded bit streams for different channels can be expanded a modest amount using different codes for different beams. For example, b1 for channel 1 can be expanded to a four-times bit rate stream of b1,−b1,b1,−b1 while that for channel 2 can be expanded to b2,b2,−b2,−b2 and that for b3 to b3,−b3,−b3,b3. These will be recognized as orthogonal spreading codes, thus giving signals in different groups of beams orthogonality. Since a small bitrate expansion of 4:1 can only create groups of four orthogonal signals, the orthogonality is preferably applied between neighboring beams where directive discrimination is more difficult. Beams that are separated by greater angular amounts are less liable to interfere with one another and so do not need to be orthogonal. Even non-orthogonal codes can be useful for aiding directive discriminating between adjacent beams. The advantage of non-orthogonal codes is that a greater number of non-orthogonal codes are available for the same bitrate increase. A suitable code set is described in U.S. Pat. No. 5,353,352 and CIP (45-MR-819R) both of which are incorporated herein by reference. The use of such non-orthogonal codes is that the interference between different, neighboring beams is averaged over several signals in several neighboring beams, so that one signal in one beam alone does not represent a dominant interferer.

So far the beamformer and modulation waveform generators described have been particularly envisaged for use with PSK modulation, although any form of linear modulation can be used. The linearity property allows the order of the beamforming and modulation waveform generation to be interchanged. An example of how this principle may be applied to QPSK or Offset QPSK will now be given.

In QPSK, a pair of bits from each speech signal is to be modulated one on a cosine radio waveform and the other on a sine waveform. This can be represented by saying that the real part of the complex modulation shall be b1 and the imaginary part b1'. The QPSK symbol so produced can be denoted by $$S1=b1+jb1'$$

Symbols from other channels to be transmitted in different directions can also be denoted by $$S2=b2+jb2'$$

$$S3=b3+jb3'$$

and so-on.

Thus the vector of symbols presented to the beamforming network can be written $$\begin{bmatrix} S1 \\ S2 \\ S3 \\ \vdots \\ SN \end{bmatrix} = \begin{bmatrix} b1 \\ b2 \\ b3 \\ \vdots \\ bN \end{bmatrix} + j\begin{bmatrix} b1' \\ b2' \\ b3' \\ \vdots \\ bN' \end{bmatrix}$$

Due to the linearity property of the beamformer, the real bit vector and the imaginary bit vector can be separately passed through the beamformer and then the results added, giving a weighting ‘j’ to the imaginary part.

For example, the beamformer in FIG. 6 can first be used with the-real bit vector applied to its inputs to obtain a result R1+jI1 for element 1, and corresponding results for other elements. Then the imaginary bit vector is applied obtaining a result R1'+jI1'. This is to be weighted with j and added to the previous result to obtain:

$$E1=(R1+jI1)+j(R1'+jI1')=(R1-I1')+j(R1'+I1)$$

Serial arithmetic adders can be used to form R1−I1' and R1'+I1 by storing the previous results (obtained by applying the real bit vector) in a recirculating shift register and then serially adding the new result obtained by applying the imaginary bit vector. Word-Parallel adders can of course alternatively be used. The complex result may then be fed to a waveform generator such as the generator shown in FIG. 5. Alternatively, recognizing that the circuit in FIG. 5 already performs weighted addition of successively generated samples from beamformer 21, the addition of successive samples with weight j obtained by alternately presenting real and imaginary bit vectors to the beamformer may be realized by feeding real results R for real bit vectors into the delay element 60 alternating with imaginary parts I' for imaginary bit vectors with a sign change applied to obtain −I', and feeding imaginary values I to the delay element 64 alternating with real parts R'. The convolvers 63 and 66 then operate once for every two complex values (R,I; R',I') shifted in to obtain a set of QPSK samples out an upsampled rate. The convolver 63 can also apply sign-changed weights to the I' input values, so that it is unnecessary to form −I' values for input to the delay element 60.

Figure 11:
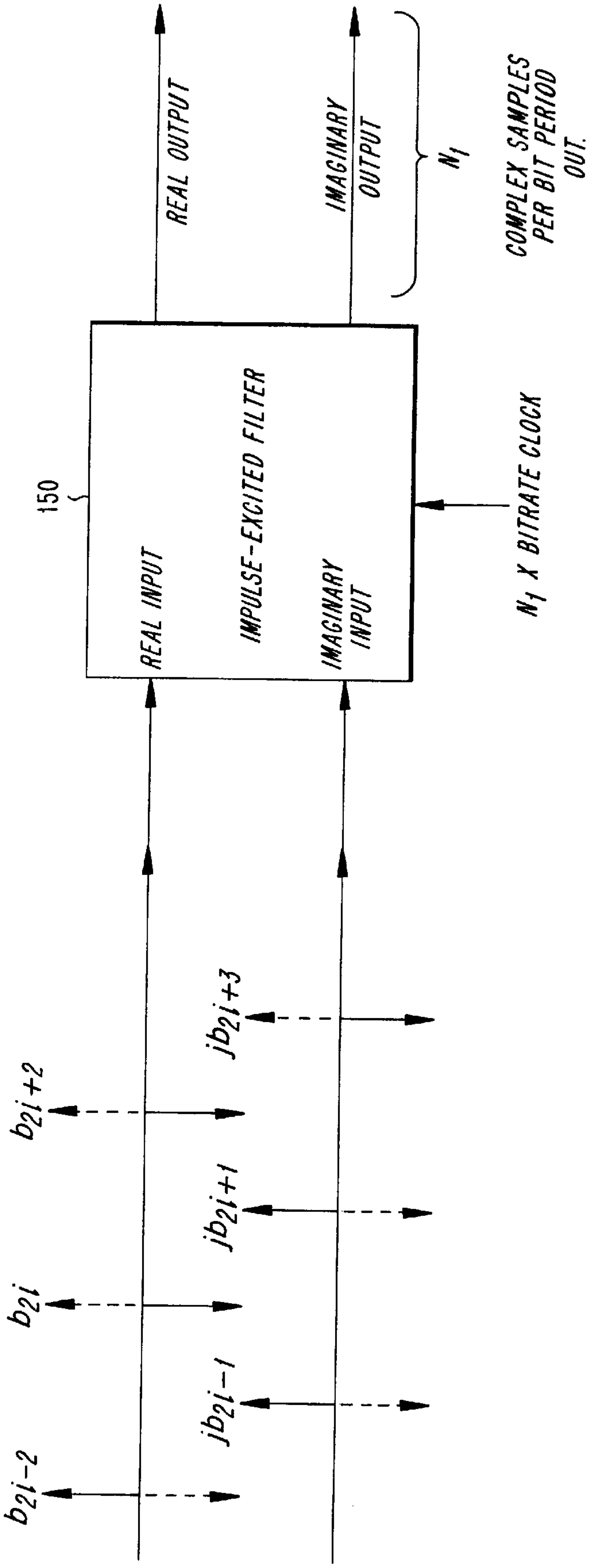
FIG. 11 illustrates the generation of offset QPSK modulation waveforms.

The Offset QPSK example is more straightforward. In offset QPSK, even bits are applied to the Q-channel and odd bits are applied to the I-channel, but the I-channel bits change between changes of Q-channel bits, that is with a one bit-period time shift. When Impulse Excited modulation is considered, real impulses are applied to the modulation filter for even bits alternating with a application of imaginary impulses for odd bits, as depicted in FIG. 11.

Figure 12:
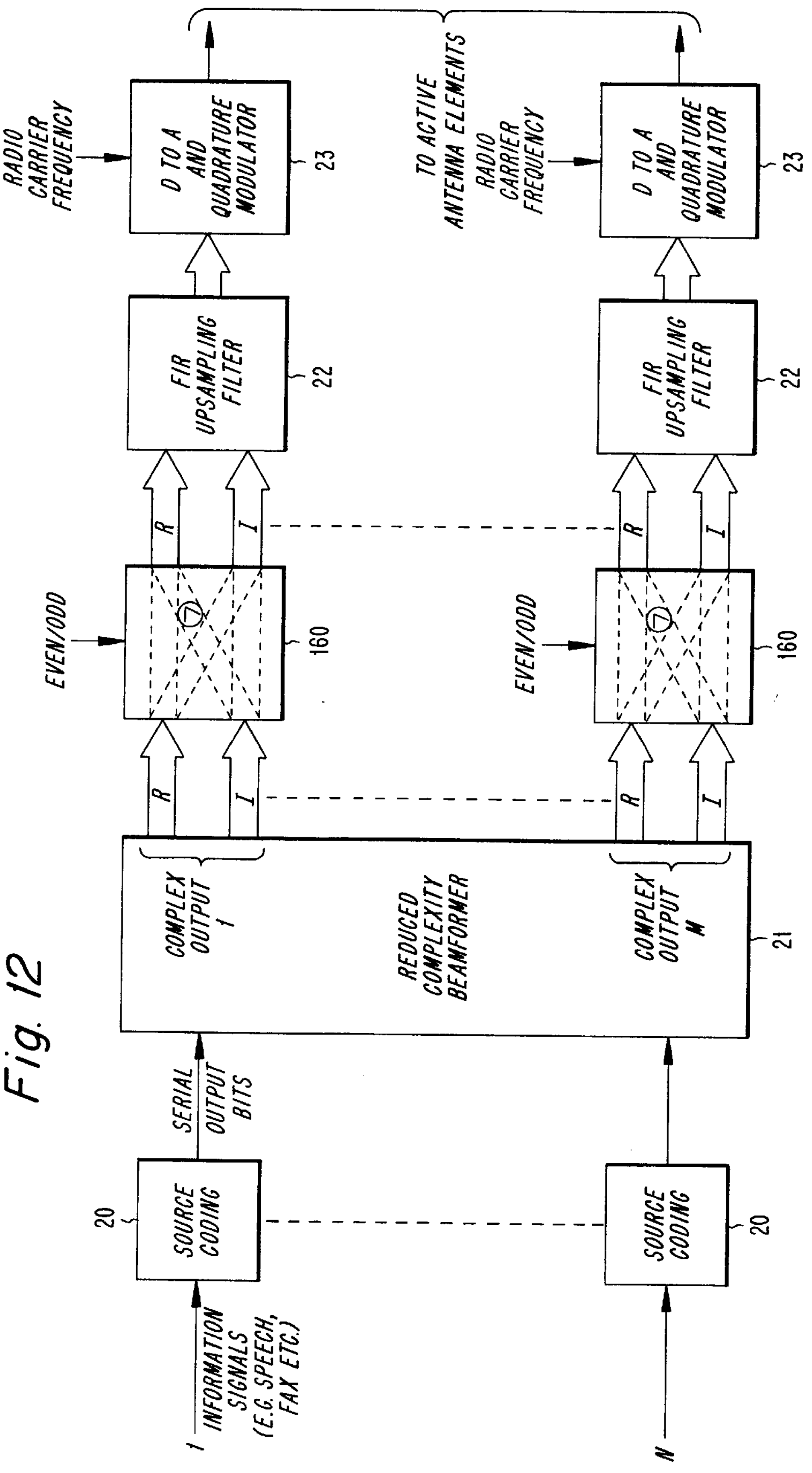
FIG. 12 illustrates an arrangement for offset QPSK beamforming according to one embodiment of the present invention.

According to the principle of interchangeability of the order of modulation waveform generation, and beamforming, the real and imaginary bit impulses are instead applied to the input of a beamforming network. As shown before, the application of an imaginary bit vector to the beamforming network is the same operation as for real vectors, if the real part of the result is taken as the imaginary part and the sign-changed imaginary part is taken as the real part. FIG. 12 shows the modification of FIG. 2 necessary to accomplish this. The source coding 20 and the beamforming network 21 are identical and operate at the same bit and sample rates. The modification for Offset QPSK consists in the addition of switches 160. The switches switch real and imaginary parts straight through to the respective real and imaginary switch outputs, for the even bits but for odd bits presented to beamformer 21, the real and imaginary parts are interchanged and a sign inversion is applied to the imaginary input to form the real output. The complex outputs from the switches 160 are then filtered and upsampled in the modulation waveform generator 22 as before, using for example FIR filters. The filtered and upsampled outputs from the modulation waveform generator 22 are complex DtoA converted and modulated on to the selected radio channel frequency in DtoA converter and modulator 23. Thus apart from the addition of the switches 160, the only difference in using Offset QPSK from the PSK version of FIG. 2 is that the upsampling filter bandwidths can be narrower because of the reduced bandwidth of QPSK modulation for the same data rate, and thus the upsampled rate may be half as much as in the PSK case. Thus Offset QPSK offers a reduction in the computations of upsampling filter 22 while requiring no change to the beamforming network 21. It will be realized also that the switches 160 can be absorbed into the modulation waveform generation units 22 of FIG. 2, and it has been shown above that the latter can be adapted to handle any of the linear modulations PSK, QPSK and Offset QPSK. Differential modulations such as DPSK, DQPSK and ODQPSK/DOQPSK can also be handled by first differentially encoding the data in the source coding units 20.

Yet another form of linear modulation known as Pi/4-QPSK or Pi/4-DQPSK (in its differential variant) has found application in mobile communications, for example in the U.S. Digital Cellular standard IS-54. In Pi/4-QPSK, two-bit (quaternary) symbols comprising an even bit as a real part and an odd bit as an imaginary part are formed. However, successive quaternary symbols are rotated 45 degrees in phase. Thus, even numbered quaternary symbols may appear as one of the four complex numbers 1+j, 1−j, −1+j or −1−j, while odd numbered symbols appear as one of the four numbers $\sqrt{2}$, $j\sqrt{2}$, $-\sqrt{2}$ or $-j\sqrt{2}$. Alternatively, the scaling may be adjusted so that the complex vector is always of length unity, giving:

$$\frac{1+J}{\sqrt{2}}\frac{1-j}{\sqrt{2}}\frac{-1+j}{\sqrt{2}} \text{ or } \frac{-1-j}{\sqrt{2}}$$

for even symbols and 1 j −1 or −j for odd symbols.

The even bit values simply represent QPSK as discussed previously. The odd values represent QPSK multiplied by the complex number $(1+j)/\sqrt{2}$. Thus by using the version of the beamformer described for QPSK, with the addition to the input of the modulation waveform generator of complex rotation through 45 degrees represented by the multiplication by $(1+j)\sqrt{(2)}$ for odd symbols, the invention may be adapted also to handle Pi/4-QPSK as well as Pi/4-DQPSK.

It has been shown above that a beamforming network for a transmitting antenna array can be constructed in a simpler fashion by practicing the invention of interchanging the modulation waveform generation and beamforming operations, such that the beamforming network operates only on single-bit quantities. This has been shown to be compatible with the use of a wide range of linear modulations including PSK, QPSK, DQPSK, ODQPSK, ODQPSK, Pi/4-QPSK, Pi/4-DQPSK and orthogonal and non-orthogonal CDMA waveforms. Other variations in modulation waveforms which are compatible with the use of the invention may be discovered by persons skilled in the art and all such uses are deemed to lie within the spirit and scope of the invention as defined in the claims.

Figure 13:
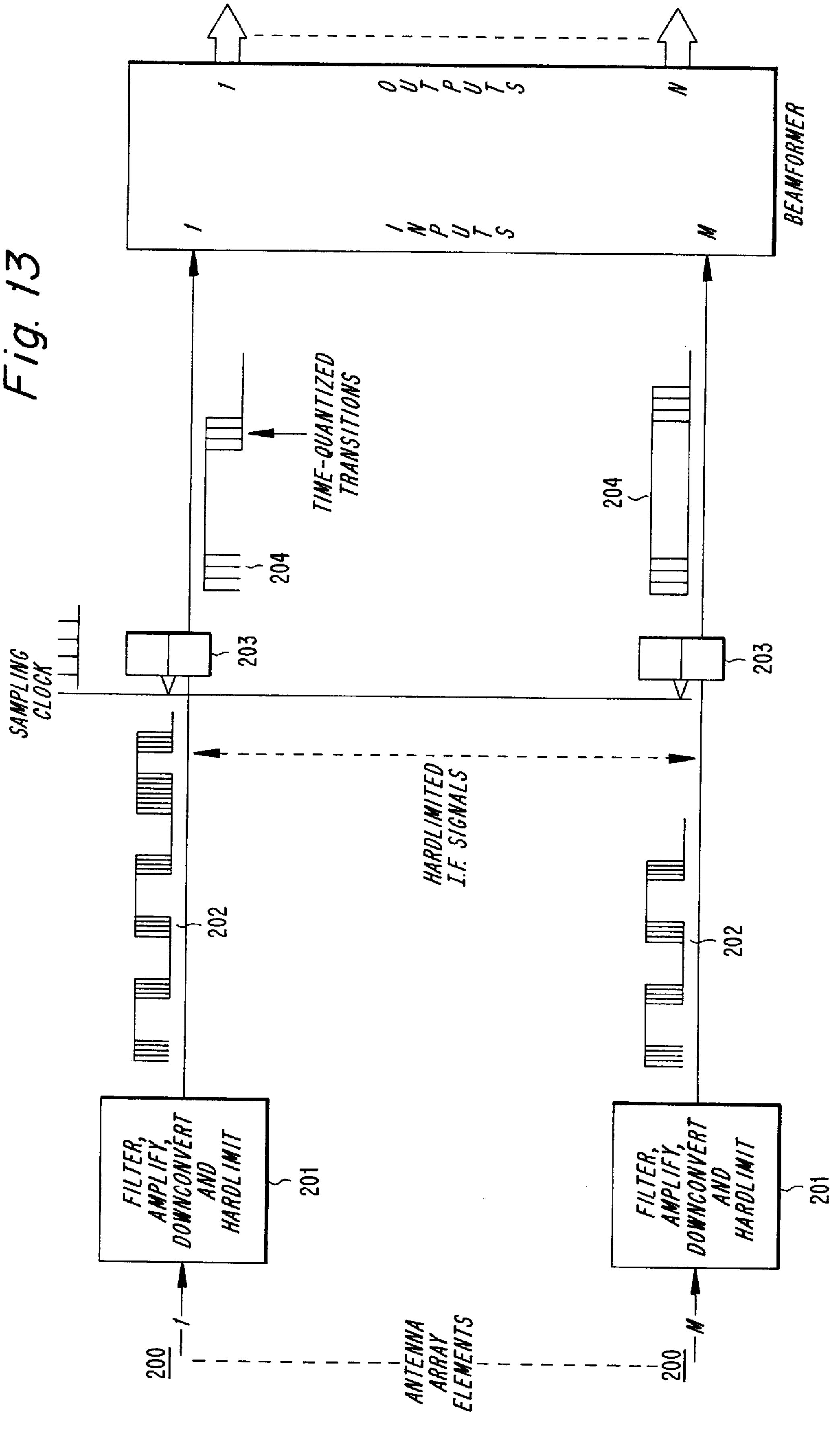
FIG. 13 illustrates the use of the inventive beamformer for reception with hardlimiting channels.

It is also possible to adapt some of the techniques employed in the inventive beamformer for reception instead of transmission. In reception, a number of receiving antenna elements receive signal+noise waveforms that are in general multi-bit quantities. However, in a large array that relies on the array gain to raise the signal to noise ratio to greater than unity, it is often the case that the signal to noise ratio of individual element signals is less than unity. When signal to noise ratios are less than unity, and all array elements are identical so that it is known a priori that the received signal components are of equal amplitude, it is possible to discard amplitude information by using a hardlimiting receiver channel behind each array element. The hardlimiting channel produces only a two-level signal at the output of the limiting If amplifier. This signal may thus be treated as a single bit quantity and processed by the inventive beamformer previously described. The hardlimiting IF signals are preferably sampled by clocking their instantaneous polarities into a flip-flop, using a sampling frequency that is greater than the bandwidth of the signal. The zero-crossings of the IF are thus quantized in time or phase to the nearest clock pulse. Even if this is relatively coarse phase quantizing, the quantizing noise is uncorrelated between different array element channels while the wanted signal is correlated thus after beamforming, the signal-to-quantizing noise is enhanced as is the signal to thermal noise ratio. FIG. 13 shows the use of hardlimiting receiver channels with the inventive beamformer.

An array of antenna elements 200 receives signals plus noise. Each antenna signal is filtered, amplified, optionally downconverted to a convenient intermediate frequency, and then hardlimited in receiver channels 201 to produce 2-level signals 202. These signals contain information in the exact timing of their transitions between high and low levels. Since digital logic circuits are not generally well adapted to combine logic signals with randomly timed transitions, the transitions are constrained to occur only at the regular ticks of a sampling clock by flip-flops 203. The sampling clock frequency is nevertheless high enough to register changes in the transition timing of a fraction of a cycle. The instantaneous phase of each element signal is thus captured and quantized into 2-level digital streams 204. These streams an be combined using the beamformer previously described that accepts single-bit input quantities. Other means of capturing the phase could also be used; for example, a coarse phase digitizer could classify the phase into the nearest of the four values +/−45 degrees or +/−135 degrees delivering representative complex numbers ±1±j, which are single bit quantities. A beamforming network that can accept an input consisting of a real vector of ±1's and an imaginary vector of +1's has already been described and can be used to process such signals.

Figure 14:
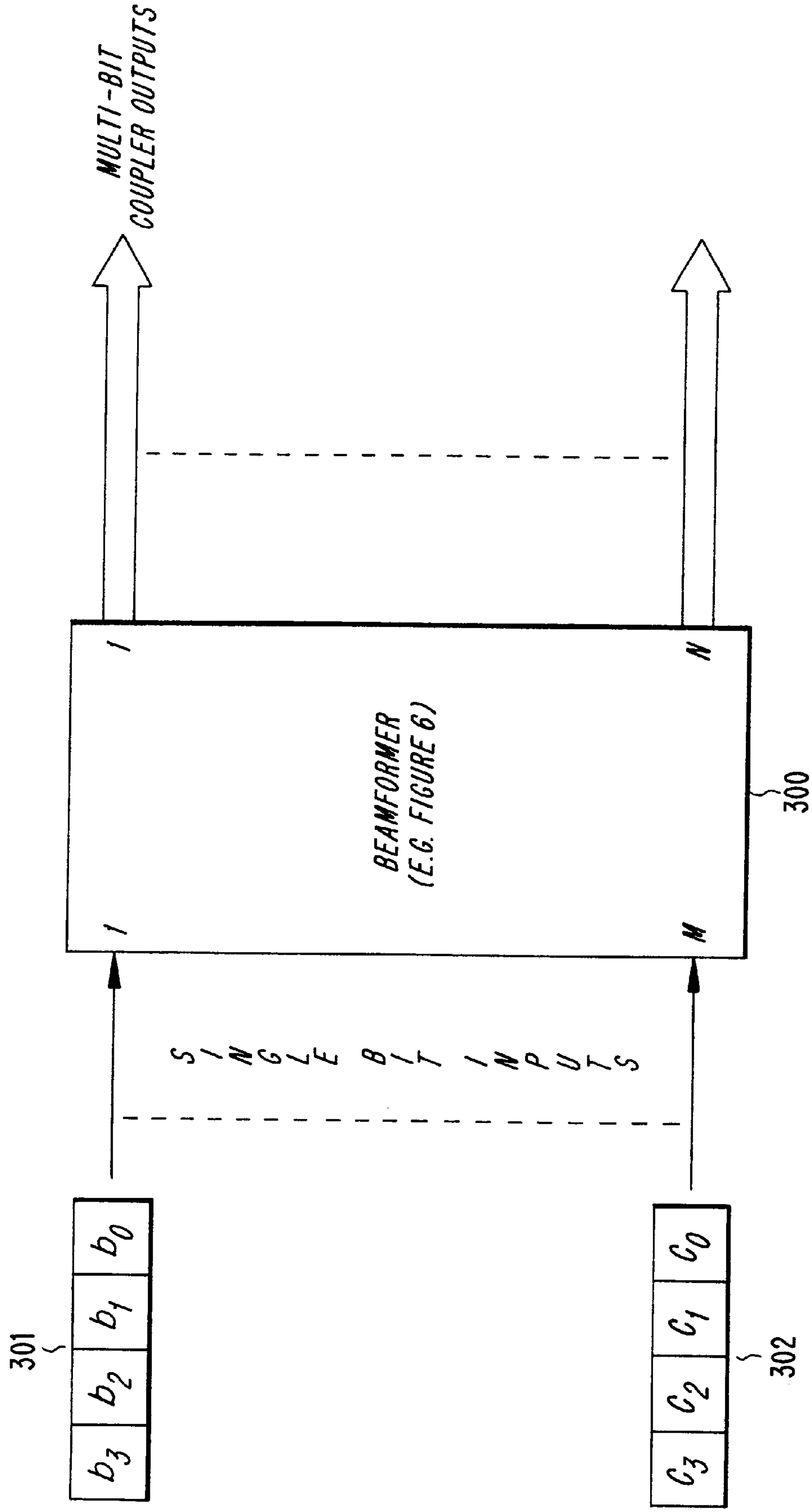
FIG. 14 illustrates the use of the inventive beamformer for receive processing of multi-bit quantities.

In cases such as smaller arrays that do not exhibit so much processing gain to reduce quantizing noise, it may not be desirable to use such coarse quantizing as hardlimiting receiver channels represent. In such cases the received element signals would be converted down to the quadrature baseband (I,Q signals) using known techniques of amplifying, filtering, downconversion and finally quadrature demodulation and then digitized to an accuracy adequate to reduce quantizing noise to a desired level. An alternative method of digitizing radio signals to produce complex numbers is the LOGPOLAR method disclosed in U.S. Pat. No. 5,048,059 which is incorporated herein by reference. The logpolar method provides digitized outputs related to the logarithm of the instantaneous signal+noise amplitude and to instantaneous signal+noise phase. These values may be converted to I,Q (Cartesian) representation by means of antilog and cos/sin look-up tables for processing in a beamforming network. Although the inventive beamforming network is conceived principally to take advantage of processing only single-bit quantities, it may also be used to process multi-bit Cartesian complex signal representations as will be explained with reference to FIG. 14.

Multi-bit values (b3,b2,b1,b0) (c3,c2,c1,c0), which may for example represent the real parts of a set of received signals, are serially presented to the beamforming network 300 least significant bit first. The beamformer is adapted to combine the single bit input b0 c0 values to produce multi-bit output values SOi=Cli·bO+. . . +Cni·c0 where Cli are the set of beamforming coefficients for beam/signal number 'i'.

Now the next most significant bits b1 . . . c1 are presented to the beamformer and an output Sli=Cli·b1+. . . +Cni·cl is obtained.

In a similar way, S2i and S3i obtain sequentially are also S2i=Cli·b2+. . . Cni·c2 and S3i=Cli·b3+. . . Cni·c3

Since the relative significance of the bits b3, b2, b1, b0 and c3, c2, c1, c0 is in the ratio 8:4:2:1 it is only necessary to combine the partial results S3i, S2i, S1i, S0i in these ratios to obtain the desired result of the beamforming operation on the multibit values 8b3+4b2+2b1+b0, i.e.

Si=8·S3i+4·S2i+2Sli+SOi is the desired result.

If the beamformer 300 provides parallel word outputs, it is only necessary to use a complex accumulator to accumulate the successive complex number outputs SOi, Sli, S2i, S3i, with a left shift of the real and imaginary accumulator after each accumulation to account for the binary weighting. In this way, the inventive beamformer for processing single bit values can be used to also process multibit values.

When the inputs are complex numbers, either two beam formers can be used whose complex outputs are added, or the same beamformer can be used alternately to process real and imaginary input bit vectors. For example, the vector of least significant bits (real) is first presented to the beamformer and an output SOi=ROi+IOi is obtained and accumulated in real and imaginary accumulators respectively. Then the vector of imaginary LSB's is presented, obtaining ROi' and IOi'. This must be weighted by j before accumulating, which means that ROi' is accumulated into the imaginary accumulator and IOi' is subtracted from the real accumulator. Both accumulators are the left shifted one place and the process continues with the vector of second least significant bits (real) followed by the vector of 2nd LSBs (imaginary) and so forth until the final result is obtained. Even with modest array sizes, having modest directive gain after beamforming, the number of significant bits of the real and imaginary inputs does not have to be great and 4 significant bits would in most cases be sufficient. Thus, because of the short input word length, the inventive beamformer avoids NxM complex multiplies and reduces even the number of remaining additions substantially by judicious use of precomputed look-up tables, and can be very advantageous in reducing cost and complexity. The beamformer shown in FIG. 6 may be time shared between different timeslots or channel frequencies, processing speed permitting, and may be used as may the modification in FIG. 8 to vary the beam directions from frequency to frequency or timeslot to timeslot. All such variations are deemed to fall within the scope of the claims relating to beamforming for the purposes of reception.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced herein.

What is claimed is:

1. A digital beamforming network for transmitting a first number of digital information signals using a second number of antenna array elements, comprising:

means for assembling one information bit selected from each of said information signals into a bit vector;

digital processing means having an input for said bit vector and a number of outputs equal to said second number of antenna elements for processing said bit vector; and modulation waveform generation means, coupled to each of said second number of outputs, for generating a signal for transmission by each antenna element.

2. The beamforming network according to claim 1, wherein said modulation generation means includes FIR filtering means using a set of FIR coefficients.

3. The beamforming network according to claim 2, wherein said coefficients form a square root of a Nyquist filter to an information signals data rate.

4. The beamforming network according to claim 1, wherein said modulation waveform generation means generates CDMA signals using a spreading code.

5. The beamforming network according to claim 1, wherein said modulation waveform generation means forms a filtered PSK signal.

6. The beamforming network according to claim 1, wherein said modulation waveform generation means forms a filtered QPSK signal.

7. The beamforming network according to claim 1, wherein said modulation waveform generation means forms a filtered Offset QPSK signal.

8. The beamforming network according to claim 1, wherein said modulation waveform generation means forms a filtered Pi/4-shifted QPSK signal.

9. The beamforming network according to claim 1, wherein said modulation waveform generation means forms a filtered DPSK signal.

10. The beamforming network according to claim 1, wherein said modulation waveform generation means forms a filtered DQPSK signal.

11. The beamforming network according to claim 1, wherein said modulation waveform generation means forms a filtered Offset DQPSK signal.

12. The beamforming network according to claim 1, wherein said modulation waveform generation means forms a filtered Pi/4-shifted DQPSK signal.

13. The beamforming network according to claim 1, wherein said modulation waveform generation means comprises Digital to Analog conversion.

14. The beamforming network according to claim 13, wherein said modulation waveform generation means comprises Quadrature Modulation.

15. The beamforming network according to claim 13, wherein said Digital-to-Analog conversion comprises high-bitrate Sigma-Delta Modulation.

16. The beamforming network according to claim 1, wherein said digital processing means comprises memory means to store precomputed look-up tables of partial sums of predetermined coefficients with arithmetic signs determined by bits of said input bit vector.

17. The beamforming network according to claim 16, wherein said partial sums are precomputed and stored for every combination of said bits of said bit vector.

18. The beamforming network according to claim 16 further comprising digital adders combine the outputs of more than one of said look-up tables.

19. The beamforming network according to claim 18, wherein digital adders are serial digital adders.

20. The beamforming network according to claim 19, wherein said look-up table values are stored with bits of increasing significance in successive memory word addresses, and different bits of said words represent bits of like significance from several of said precomputed values.

21. The beamforming network according to claim 16, wherein said memory means further stores values computed for more than one set of said coefficients.

22. The beamforming network according to claim 21, wherein values corresponding to a desired set of coefficients are selected from said memory by applying a channel address to said memory.

23. The beamforming network according to claim 22, wherein said channel address represents a timeslot of a TDMA frame.

24. The beamforming network according to claim 22, wherein said channel address represents a frequency channel.

25. The beamforming network according to claim 1, wherein said digital processing means has a further input for receiving a channel indicating signal.

26. The beamforming network according to claim 25, wherein said channel indicating signal represents a timeslot of a TDMA frame.

27. The beamforming network according to claim 25, wherein said channel indicating signal represents a frequency channel.

28. A digital beamforming network for transmitting a first times a second number of digital information signals using a third number of antenna array elements and said second number of communications channels, comprising:

means for assembling one information bit selected from each of a first said number of information signals for transmission on one of said second number of communications channels and assembling said selected bits into a bit vector;

digital processing means having an input for said bit vector and a number of outputs equal to said third number of antenna elements; and modulation waveform generation means, coupled to each of said third number of outputs, for generating a signal for transmission by each antenna element on said one of said communications channels.

29. The beamforming network according to claim 28, wherein said assembling means successively assembles said bit vectors using information bits for transmission on successive communications channels and said digital processing means successively process said bit vectors to produce corresponding successive outputs.

30. The beamforming network according to claim 29, wherein said modulation waveform generation means further successively generates signals for transmission on successive communications channels using said successive outputs.

31. The beamforming network according to claim 28, wherein said communications channels are timeslots of a TDMA frame.

32. A digital beamformer for transmitting a first number of digital information streams using a second number of antenna array elements, comprising:

selection means for selecting one information bit from each of said information streams and assembling them to form a real bit vector and for selecting another information bit from said information streams to form an imaginary bit vector;

digital processing means for processing said real bit vector to obtain for each of said second number of antenna elements a first real and a first imaginary digital output word and to process said imaginary bit vector to obtain a corresponding number of second real and second imaginary output words;

combining means for combining for each antenna element its associated first real and second imaginary output words and to combine its associated first imaginary and second real output words to obtain a corresponding multi-bit QPSK modulation symbol; and modulation waveform generation means for processing for each of said antenna elements said QPSK modulation symbols to obtain a corresponding QPSK-modulated radio waveform.

33. The beamformer according to claim 32, wherein said modulation generation means includes FIR filtering means using a set of FIR coefficients.

34. The beamformer according to claim 33, wherein said coefficients form a square root of a Nyquist filter to the symbol rate of said QPSK modulation symbols.

35. The beamformer according to claim 32, wherein said modulation waveform generation means comprises Quadrature Modulation.

36. The beamformer according to claim 32, wherein said modulation waveform generation means comprises Digital to Analog conversion.

37. The beamformer according to claim 36, wherein said Digital-to-Analog conversion comprises high-bitrate Sigma-Delta Modulation.

38. The beamformer according to claim 32, wherein said digital processing means comprises memory means to store precomputed look-up tables of partial sums of predetermined coefficients with arithmetic signs determined by bits of said input bit vector.

39. The beamformer according to claim 38, wherein said partial sums are precomputed and stored for every combination of said bits of said bit vector.

40. The beamformer according to claim 38, further comprising digital adders to combine the outputs of more than one of said look-up tables.

41. The beamformer according to claim 40, wherein said digital adders are serial digital adders.

42. The beamformer according to claim 41, wherein said look-up table values are stored with bits of increasing significance in successive memory word addresses, and different bits of said words represent bits of like significance from several of said precomputed values.

43. The beamformer according to claim 38, wherein said memory means further stores values computed for more than one set of said coefficients.

44. The beamformer according to claim 43, wherein values corresponding to a desired set of coefficients are selected from said memory by applying a channel address to said memory address inputs.

45. The beamformer according to claim 44, wherein said channel address represents a timeslot of a TDMA frame.

46. The beamformer according to claim 44, wherein said channel address represents a frequency channel.

47. The beamformer according to claim 32, wherein said digital processing means has a further input to receive a channel indicating signal.

48. The beamformer according to claim 47, wherein said channel indicating signal represents a timeslot of a TDMA frame.

49. The beamformer according to claim 47, wherein said channel indicating signal represents a frequency channel.

50. A digital beamformer for transmitting a first number of digital information streams using a second number of antenna array elements, comprising:

selection means for selecting one information bit at a time from each of said information streams and assembling them to form a real bit vector and for selecting another information bit from said information streams to form an imaginary bit vector in a repetitive sequence;

digital processing means for repetitively processing said real bit vectors alternately with said imaginary bit vectors to obtain for each of said second number of antenna elements a first real and a first imaginary digital output word related to each real bit vector and to obtain a corresponding number of second real and second imaginary output words related to each imaginary bit vector;

switching means for selecting first real digital output words alternating with said second imaginary output words to produce a stream of real OQPSK modulation values and for alternately selecting second real digital output words alternating with first imaginary output words to produce a stream of imaginary OQPSK modulation values; and modulation waveform generation means for processing for each of said antenna elements said real and imaginary DQPSK modulation values to obtain a corresponding DQPSK-modulated radio waveform.

51. The beamformer according to claim 50, wherein said modulation waveform generation means includes FIR filtering means using a set of FIR coefficients.

52. The beamformer according to claim 51, wherein said coefficients form a square root of a Nyquist filter to the symbol rate of said OQPSK modulation symbols.

53. The beamformer according to claim 50, wherein said modulation waveform generation means comprises Quadrature Modulation.

54. The beamformer according to claim 50, wherein said modulation waveform generation means comprises Digital to Analog conversion.

55. The beamformer according to claim 54, wherein said Digital-to-Analog conversion comprises high-bitrate Sigma-Delta Modulation.

56. The beamformer according to claim 50, wherein said digital processing means comprises memory means to store precomputed look-up tables of partial sums of predetermined coefficients with arithmetic signs determined by bits of said input bit vector.

57. The beamformer according to claim 56, wherein said partial sums are precomputed and stored for every combination of said bits of said bit vector.

58. The beamformer according to claim 56 further comprising digital adders to combine the outputs of more than one of said look-up tables.

59. The beamformer according to claim 58, wherein said digital adders are serial digital adders.

60. The beamformer according to claim 59, wherein said look-up table values are stored with bits of increasing significance in successive memory word addresses, and different bits of said words represent bits of like significance from several of said precomputed values.

61. The beamformer according to claim 56, wherein said memory means further stores values computed for more than one set of said coefficients.

62. The beamformer according to claim 61, wherein values corresponding to a desired set of coefficients are selected from said memory by applying a channel address to said memory address inputs.

63. The beamformer according to claim 62, wherein said channel address represents a timeslot of a TDMA frame.

64. The beamformer according to claim 62, wherein said channel address represents a frequency channel.

65. The beamformer according to claim 50, wherein said digital processing means has a further input to receive a channel indicating signal.

66. The beamformer according to claim 65, wherein said channel indicating signal represents a timeslot of a TDMA frame.

67. The beamformer according to claim 65, wherein said channel indicating signal represents a frequency channel.

* * * * *